US010043170B2

(12) United States Patent
Minear et al.

(10) Patent No.: US 10,043,170 B2
(45) Date of Patent: Aug. 7, 2018

(54) APPLICATION-BASED VALUE BILLING IN A WIRELESS SUBSCRIBER NETWORK

(75) Inventors: Brian Minear, San Diego, CA (US); Julie Yu, San Diego, CA (US); Mitchell B. Oliver, San Diego, CA (US); Laurence Lundblade, San Diego, CA (US); Gerald C. Horel, Brentwood Bay (CA); Jaiteerth Patwari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 1298 days.

(21) Appl. No.: 11/040,872

(22) Filed: Jan. 20, 2005

(65) Prior Publication Data

US 2005/0192878 A1 Sep. 1, 2005

Related U.S. Application Data

(60) Provisional application No. 60/538,206, filed on Jan. 21, 2004.

(51) Int. Cl.
*G06Q 40/00* (2012.01)
*G06Q 20/32* (2012.01)
*G06Q 30/04* (2012.01)

(52) U.S. Cl.
CPC ......... *G06Q 20/32* (2013.01); *G06Q 20/3223* (2013.01); *G06Q 30/04* (2013.01)

(58) Field of Classification Search
USPC .................. 705/34–35, 38, 40; 455/406–407
See application file for complete search history.

(56) References Cited

U.S. PATENT DOCUMENTS

| 628,294 A | 7/1899 | Ira |
| 4,156,903 A | 5/1979 | Barton et al. |
| 4,528,589 A | 7/1985 | Block et al. |
| 4,975,942 A | 12/1990 | Zebryk |
| 5,005,122 A | 4/1991 | Griffin et al. |
| 5,013,897 A | 5/1991 | Harman et al. |
| 5,329,619 A | 7/1994 | Page et al. |

(Continued)

FOREIGN PATENT DOCUMENTS

| CA | 2267549 A1 | 9/2000 |
| CA | 2363220 A1 | 5/2003 |

(Continued)

OTHER PUBLICATIONS

McAuliffe W. Broadband heading for move to metered billing. New Media Age [serial online]. Apr. 29, 2004;:1. Available from: Business Source Complete, Ipswich, MA. Accessed Jul. 1, 2013.*

(Continued)

*Primary Examiner* — Anita Coupe
*Assistant Examiner* — Nancy N Prasad
(74) *Attorney, Agent, or Firm* — Muncy, Geissler, Olds & Lowe, P.C.

(57) ABSTRACT

Systems and methods for application-based billing in a wireless subscriber billing system are disclosed. A wireless client device can generate and transmit a billing request to the billing system. The billing system generates a validation response to the billing request and transmits the validation response to the client device. The validation response can be processed by the client device to enable a service linked to the billing request.

60 Claims, 8 Drawing Sheets

(56) References Cited

U.S. PATENT DOCUMENTS

| | | | |
|---|---|---|---|
| 5,564,070 A | 10/1996 | Want et al. | |
| 5,608,781 A | 3/1997 | Seiderman | |
| 5,619,247 A | 4/1997 | Russo | |
| 5,634,012 A | 5/1997 | Stefik et al. | |
| 5,666,293 A | 9/1997 | Metz et al. | |
| 5,666,397 A | 9/1997 | Lamons et al. | |
| 5,761,485 A | 6/1998 | Munyan | |
| 5,812,533 A | 9/1998 | Cox et al. | |
| 5,812,988 A | 9/1998 | Sandretto | |
| 5,845,267 A | 12/1998 | Ronen | |
| 5,852,812 A * | 12/1998 | Reeder | G06Q 20/04 705/39 |
| 5,857,201 A | 1/1999 | Wright, Jr. et al. | |
| 5,907,837 A | 5/1999 | Ferrel et al. | |
| 5,940,752 A | 8/1999 | Henrick | |
| 5,956,034 A | 9/1999 | Sachs et al. | |
| 5,970,490 A | 10/1999 | Morgenstern | |
| 5,986,690 A | 11/1999 | Hendricks | |
| 6,014,641 A | 1/2000 | Loeb et al. | |
| 6,035,281 A | 3/2000 | Crosskey et al. | |
| 6,047,051 A | 4/2000 | Ginzboorg et al. | |
| 6,088,717 A | 7/2000 | Reed et al. | |
| 6,141,404 A | 10/2000 | Westerlage et al. | |
| 6,151,606 A | 11/2000 | Mendez | |
| 6,181,704 B1 | 1/2001 | Drottar et al. | |
| 6,185,198 B1 | 2/2001 | Ladue | |
| 6,185,683 B1 | 2/2001 | Ginter et al. | |
| 6,202,051 B1 | 3/2001 | Woolston | |
| 6,202,054 B1 | 3/2001 | Lawlor et al. | |
| 6,226,618 B1 | 5/2001 | Downs et al. | |
| 6,230,168 B1 | 5/2001 | Unger et al. | |
| 6,230,269 B1 | 5/2001 | Spies et al. | |
| 6,253,189 B1 | 6/2001 | Feezell et al. | |
| 6,253,239 B1 | 6/2001 | Shklar et al. | |
| 6,253,326 B1 | 6/2001 | Lincke et al. | |
| 6,263,326 B1 | 7/2001 | Chandra | |
| 6,263,362 B1 | 7/2001 | Donoho et al. | |
| 6,266,401 B1 | 7/2001 | Marchbanks et al. | |
| 6,269,157 B1 | 7/2001 | Coyle | |
| 6,282,294 B1 | 8/2001 | Deo et al. | |
| 6,311,223 B1 | 10/2001 | Bodin et al. | |
| 6,321,078 B1 | 11/2001 | Menelli et al. | |
| 6,324,565 B1 | 11/2001 | Holt, III | |
| 6,327,574 B1 | 12/2001 | Kramer et al. | |
| 6,334,114 B1 | 12/2001 | Jacobs et al. | |
| 6,334,116 B1 | 12/2001 | Ganesan et al. | |
| 6,336,137 B1 | 1/2002 | Lee et al. | |
| 6,343,318 B1 | 1/2002 | Hawkins et al. | |
| 6,366,893 B2 | 4/2002 | Hannula et al. | |
| 6,381,325 B1 * | 4/2002 | Hanson | H04M 3/4931 379/114.01 |
| 6,389,464 B1 | 5/2002 | Krishnamurthy et al. | |
| 6,427,076 B2 | 7/2002 | Skog | |
| 6,434,535 B1 | 8/2002 | Kupka et al. | |
| 6,453,160 B1 | 9/2002 | Thomas et al. | |
| 6,460,076 B1 | 10/2002 | Srinivasan | |
| 6,463,534 B1 | 10/2002 | Geiger et al. | |
| 6,493,722 B1 | 12/2002 | Daleen et al. | |
| 6,535,726 B1 * | 3/2003 | Johnson | G06Q 20/04 235/381 |
| 6,549,770 B1 | 4/2003 | Marran | |
| 6,597,903 B1 | 7/2003 | Dahm et al. | |
| 6,598,026 B1 | 7/2003 | Ojha et al. | |
| 6,606,744 B1 | 8/2003 | Mikurak | |
| 6,622,017 B1 | 9/2003 | Hoffman | |
| 6,628,934 B2 | 9/2003 | Rosenberg et al. | |
| 6,665,711 B1 | 12/2003 | Boyle et al. | |
| 6,683,941 B2 | 1/2004 | Brown et al. | |
| 6,704,716 B1 | 3/2004 | Force | |
| 6,721,716 B1 * | 4/2004 | Gross | G06Q 20/02 705/34 |
| 6,741,980 B1 | 5/2004 | Langseth et al. | |
| 6,742,043 B1 | 5/2004 | Moussa et al. | |
| 6,754,320 B2 | 6/2004 | Daase et al. | |
| 6,757,710 B2 | 6/2004 | Reed | |
| 6,792,271 B1 | 9/2004 | Sherman et al. | |
| 6,792,280 B1 | 9/2004 | Hori et al. | |
| 6,816,721 B1 | 11/2004 | Rudisill | |
| 6,820,121 B1 | 11/2004 | Callis et al. | |
| 6,829,593 B1 | 12/2004 | Ritter et al. | |
| 6,857,067 B2 | 2/2005 | Edelman | |
| 6,873,936 B2 | 3/2005 | Reel et al. | |
| 6,880,750 B2 | 4/2005 | Pentel | |
| 6,883,142 B2 | 4/2005 | Shimamoto et al. | |
| 6,928,441 B2 | 8/2005 | Haegele | |
| 6,937,996 B1 | 8/2005 | Forsythe et al. | |
| 6,941,139 B1 | 9/2005 | Shupe et al. | |
| 6,941,270 B1 | 9/2005 | Hannula | |
| 6,954,793 B2 | 10/2005 | Ramaswamy et al. | |
| 6,955,883 B2 | 10/2005 | Margus et al. | |
| 6,957,793 B2 | 10/2005 | Gautier et al. | |
| 6,965,883 B2 | 11/2005 | Xu et al. | |
| 6,978,273 B1 | 12/2005 | Bonneau et al. | |
| 6,985,882 B1 | 1/2006 | Del Sesto | |
| 6,996,537 B2 | 2/2006 | Minear et al. | |
| 7,010,500 B2 | 3/2006 | Aarnio | |
| 7,013,289 B2 | 3/2006 | Horn et al. | |
| 7,020,688 B2 | 3/2006 | Sykes, Jr. | |
| 7,039,389 B2 * | 5/2006 | Johnson, Jr. | G06Q 20/04 455/405 |
| 7,043,447 B2 | 5/2006 | Hughes et al. | |
| 7,047,405 B2 | 5/2006 | Mauro | |
| 7,068,680 B1 | 6/2006 | Kaltenmark et al. | |
| 7,099,891 B2 | 8/2006 | Harris et al. | |
| 7,113,766 B2 | 9/2006 | Horel et al. | |
| 7,117,504 B2 | 10/2006 | Smith et al. | |
| 7,177,837 B2 * | 2/2007 | Pegaz-Paquet | G06Q 20/04 705/35 |
| 7,184,747 B2 | 2/2007 | Bogat | |
| 7,200,566 B1 | 4/2007 | Moore et al. | |
| 7,206,842 B2 | 4/2007 | Nainani et al. | |
| 7,218,917 B2 | 5/2007 | Pradhan et al. | |
| 7,228,333 B1 | 6/2007 | Smith | |
| 7,233,790 B2 | 6/2007 | Kjellberg et al. | |
| 7,260,194 B1 | 8/2007 | Meyers et al. | |
| 7,269,654 B2 | 9/2007 | Srinivas | |
| 7,278,164 B2 | 10/2007 | Raiz et al. | |
| 7,286,655 B2 | 10/2007 | Voorman et al. | |
| 7,293,099 B1 | 11/2007 | Kalajan | |
| 7,334,025 B2 | 2/2008 | Kuriya | |
| 7,362,745 B1 | 4/2008 | Cope et al. | |
| 7,370,120 B2 | 5/2008 | Kirsch et al. | |
| 7,404,148 B2 | 7/2008 | Lincke et al. | |
| 7,415,439 B2 | 8/2008 | Kontio et al. | |
| 7,436,816 B2 | 10/2008 | Mehta et al. | |
| 7,444,411 B2 | 10/2008 | Sung et al. | |
| 7,467,198 B2 | 12/2008 | Goodman et al. | |
| 7,490,045 B1 | 2/2009 | Flores et al. | |
| 7,526,450 B2 | 4/2009 | Hughes et al. | |
| 7,574,377 B2 | 8/2009 | Carapelli | |
| 7,577,616 B2 | 8/2009 | Zhu | |
| 7,583,953 B2 | 9/2009 | Choi et al. | |
| 7,660,755 B2 | 2/2010 | Amato et al. | |
| 7,711,680 B2 | 5/2010 | Barnes-Leon et al. | |
| 7,752,217 B2 | 7/2010 | Sawashima et al. | |
| 7,894,803 B2 | 2/2011 | Kamada | |
| 7,904,528 B2 | 3/2011 | Zilliacus et al. | |
| 7,907,937 B2 | 3/2011 | Engelhart | |
| 8,028,056 B1 | 9/2011 | Krishna et al. | |
| 8,150,736 B2 | 4/2012 | Horn et al. | |
| 8,489,470 B2 | 7/2013 | Kahlon et al. | |
| 2001/0013020 A1 | 8/2001 | Yoshida et al. | |
| 2001/0019604 A1 | 9/2001 | Joyce et al. | |
| 2001/0032254 A1 | 10/2001 | Hawkins | |
| 2001/0034686 A1 | 10/2001 | Eder | |
| 2001/0036271 A1 * | 11/2001 | Javed | H04N 7/17327 380/217 |
| 2001/0037304 A1 | 11/2001 | Paiz | |
| 2001/0056362 A1 * | 12/2001 | Hanagan | G06F 17/30607 705/7.11 |
| 2002/0002603 A1 | 1/2002 | Vange | |
| 2002/0004935 A1 | 1/2002 | Huotari et al. | |
| 2002/0019764 A1 | 2/2002 | Mascarenhas | |
| 2002/0022472 A1 | 2/2002 | Watler et al. | |

(56) References Cited

U.S. PATENT DOCUMENTS

| | | |
|---|---|---|
| 2002/0022971 A1 | 2/2002 | Tanaka et al. |
| 2002/0029197 A1* | 3/2002 | Kailamaki ............ G06Q 20/102 705/40 |
| 2002/0029200 A1 | 3/2002 | Dulin et al. |
| 2002/0035688 A1 | 3/2002 | Kutaragi et al. |
| 2002/0035699 A1 | 3/2002 | Crosbie |
| 2002/0049717 A1 | 4/2002 | Routtenberg et al. |
| 2002/0052754 A1 | 5/2002 | Joyce et al. |
| 2002/0052968 A1 | 5/2002 | Bonefas et al. |
| 2002/0062290 A1 | 5/2002 | Ricci |
| 2002/0069176 A1 | 6/2002 | Newman |
| 2002/0069244 A1 | 6/2002 | Blair et al. |
| 2002/0069263 A1 | 6/2002 | Sears et al. |
| 2002/0071559 A1 | 6/2002 | Christensen et al. |
| 2002/0083006 A1 | 6/2002 | Headings et al. |
| 2002/0083050 A1 | 6/2002 | Liu et al. |
| 2002/0107706 A1* | 8/2002 | Oliver ................. G06Q 20/102 705/2 |
| 2002/0107795 A1* | 8/2002 | Minear ............... G06Q 20/102 705/40 |
| 2002/0107809 A1 | 8/2002 | Biddle et al. |
| 2002/0109706 A1 | 8/2002 | Lincke et al. |
| 2002/0111904 A1 | 8/2002 | Gruber et al. |
| 2002/0128908 A1 | 9/2002 | Levin et al. |
| 2002/0129165 A1 | 9/2002 | Dingsor et al. |
| 2002/0131401 A1 | 9/2002 | Ehreth |
| 2002/0131404 A1 | 9/2002 | Mehta et al. |
| 2002/0160752 A1 | 10/2002 | Hook et al. |
| 2002/0162112 A1* | 10/2002 | Javed ................. H04N 7/17336 725/87 |
| 2002/0165822 A1* | 11/2002 | Makipaa ............... G06Q 20/10 705/40 |
| 2002/0176553 A1 | 11/2002 | Aschir |
| 2002/0190120 A1 | 12/2002 | Pentel |
| 2002/0194143 A1 | 12/2002 | Banerjee et al. |
| 2003/0005136 A1 | 1/2003 | Eun |
| 2003/0023550 A1 | 1/2003 | Lee |
| 2003/0028903 A1 | 2/2003 | Hofrichter et al. |
| 2003/0046396 A1 | 3/2003 | Richter et al. |
| 2003/0051047 A1 | 3/2003 | Horel et al. |
| 2003/0060188 A1 | 3/2003 | Gidron et al. |
| 2003/0074328 A1* | 4/2003 | Schiff .................. G06Q 20/18 705/75 |
| 2003/0078844 A1 | 4/2003 | Takatori et al. |
| 2003/0078886 A1* | 4/2003 | Minear ............... G06Q 20/102 705/40 |
| 2003/0078895 A1 | 4/2003 | MacKay |
| 2003/0083973 A1 | 5/2003 | Horsfall |
| 2003/0083991 A1* | 5/2003 | Kikinis ............... G06O 20/102 705/40 |
| 2003/0093461 A1 | 5/2003 | Suzuki et al. |
| 2003/0093565 A1 | 5/2003 | Berger et al. |
| 2003/0096591 A1 | 5/2003 | Pohutsky et al. |
| 2003/0110044 A1* | 6/2003 | Nix ...................... G06Q 20/102 705/34 |
| 2003/0110213 A1 | 6/2003 | Munetsugu et al. |
| 2003/0120594 A1 | 6/2003 | Shaginaw et al. |
| 2003/0149958 A1 | 8/2003 | Baluja et al. |
| 2003/0151621 A1 | 8/2003 | McEvilly et al. |
| 2003/0176182 A1* | 9/2003 | Cerami ............... G06Q 20/102 455/414.1 |
| 2003/0208444 A1 | 11/2003 | Sauer |
| 2003/0212904 A1 | 11/2003 | Randle et al. |
| 2003/0233329 A1 | 12/2003 | Laraki et al. |
| 2003/0236867 A1 | 12/2003 | Natsuno et al. |
| 2004/0006517 A1 | 1/2004 | Takatori |
| 2004/0015413 A1 | 1/2004 | Abu-Hejleh et al. |
| 2004/0015562 A1 | 1/2004 | Harper et al. |
| 2004/0030601 A1 | 2/2004 | Pond et al. |
| 2004/0043753 A1 | 3/2004 | Wake et al. |
| 2004/0044623 A1* | 3/2004 | Wake et al. ....................... 705/40 |
| 2004/0116119 A1* | 6/2004 | Lewis ................. G06Q 20/102 455/435.1 |
| 2004/0137890 A1 | 7/2004 | Kalke |
| 2004/0139012 A1 | 7/2004 | Koskinen et al. |
| 2004/0181591 A1* | 9/2004 | Yu ......................... H04L 12/14 709/217 |
| 2004/0267630 A1 | 12/2004 | Au et al. |
| 2005/0086348 A1 | 4/2005 | Balassanian |
| 2005/0090258 A1* | 4/2005 | Coppinger ............... G06F 8/65 455/436 |
| 2005/0113092 A1 | 5/2005 | Coppinger et al. |
| 2005/0114155 A1 | 5/2005 | Hodges et al. |
| 2005/0125315 A1 | 6/2005 | Munoz et al. |
| 2005/0132049 A1 | 6/2005 | Inoue et al. |
| 2005/0148319 A1 | 7/2005 | Himeno |
| 2005/0192878 A1* | 9/2005 | Minear ................. G06Q 20/32 705/34 |
| 2005/0289047 A1 | 12/2005 | Oliver et al. |
| 2006/0014535 A1 | 1/2006 | Walker et al. |
| 2006/0080232 A1 | 4/2006 | Epps |
| 2006/0143119 A1* | 6/2006 | Krueger ................. G06Q 20/02 705/39 |
| 2006/0173758 A1 | 8/2006 | Minear et al. |
| 2006/0235931 A1 | 10/2006 | Ruthe et al. |
| 2006/0253350 A1* | 11/2006 | Falkenhain ............ G06Q 30/04 705/34 |
| 2006/0270386 A1 | 11/2006 | Yu et al. |
| 2006/0271449 A1 | 11/2006 | Oliver et al. |
| 2007/0003034 A1 | 1/2007 | Schultz et al. |
| 2007/0038703 A1 | 2/2007 | Tendjoukian et al. |
| 2007/0066279 A1 | 3/2007 | Silverbrook et al. |
| 2007/0083464 A1 | 4/2007 | Cordero Torres et al. |
| 2007/0123229 A1 | 5/2007 | Pousti |
| 2007/0169163 A1* | 7/2007 | Morio .................... G10H 1/365 725/131 |
| 2007/0174308 A1 | 7/2007 | Rausch |
| 2007/0197188 A1 | 8/2007 | Sprigg et al. |
| 2007/0197189 A1 | 8/2007 | Horel et al. |
| 2011/0030042 A1 | 2/2011 | Neal-Joslin |
| 2011/0143709 A1 | 6/2011 | Pousti |
| 2012/0309345 A1 | 12/2012 | Wake et al. |

FOREIGN PATENT DOCUMENTS

| | | |
|---|---|---|
| CN | 1147325 A | 4/1997 |
| CN | 1459183 A | 11/2003 |
| EP | 0780802 A2 | 6/1997 |
| EP | 0895148 A1 | 2/1999 |
| EP | 1026610 A2 | 8/2000 |
| EP | 1026853 A1 | 8/2000 |
| EP | 1033652 | 9/2000 |
| EP | 1047030 A2 | 10/2000 |
| EP | 1102191 A2 | 5/2001 |
| EP | 1122967 A2 | 8/2001 |
| EP | 1162807 A2 | 12/2001 |
| EP | 1204025 A2 | 5/2002 |
| EP | 1204054 A2 | 5/2002 |
| EP | 1403797 A1 | 3/2004 |
| EP | 1404100 A1 | 3/2004 |
| EP | 1414185 A2 | 4/2004 |
| FR | 2775550 A1 | 9/1999 |
| GB | 2349548 A | 11/2000 |
| JP | 07044261 | 2/1995 |
| JP | 07319691 A | 12/1995 |
| JP | 9319573 A | 12/1997 |
| JP | 1066050 | 3/1998 |
| JP | 10140283 A | 5/1998 |
| JP | 10260873 A | 9/1998 |
| JP | 10262059 A | 9/1998 |
| JP | 11053185 A | 2/1999 |
| JP | 11055252 A | 2/1999 |
| JP | 11069017 A | 3/1999 |
| JP | 11126188 A | 5/1999 |
| JP | H11203127 A | 7/1999 |
| JP | 200056967 | 2/2000 |
| JP | 2000078129 A | 3/2000 |
| JP | 2000505568 A | 5/2000 |
| JP | 2000357196 A | 12/2000 |
| JP | 2001195451 A | 7/2001 |
| JP | 2001202434 A | 7/2001 |
| JP | 2001243382 A | 9/2001 |

(56) References Cited

FOREIGN PATENT DOCUMENTS

| | | |
|---|---|---|
| JP | 2001250069 A | 9/2001 |
| JP | 2001265938 | 9/2001 |
| JP | 2001268623 A | 9/2001 |
| JP | 2003312324 A | 11/2001 |
| JP | 2001312666 A | 11/2001 |
| JP | 2001319168 A | 11/2001 |
| JP | 2001320509 A | 11/2001 |
| JP | 2001325234 | 11/2001 |
| JP | 2001340656 A | 12/2001 |
| JP | 2001352583 | 12/2001 |
| JP | 2002007839 A | 1/2002 |
| JP | 2002015160 A | 1/2002 |
| JP | 2002027151 | 1/2002 |
| JP | 2002091850 A | 3/2002 |
| JP | 2002093361 A | 3/2002 |
| JP | 2002094450 A | 3/2002 |
| JP | 200299441 | 4/2002 |
| JP | 2002099289 A | 4/2002 |
| JP | 2002101315 A | 4/2002 |
| JP | 2002109395 A | 4/2002 |
| JP | 2002132367 | 5/2002 |
| JP | 2002133316 A | 5/2002 |
| JP | 2002163258 | 6/2002 |
| JP | 2002163467 A | 6/2002 |
| JP | 2002175387 A | 6/2002 |
| JP | 2002197294 | 7/2002 |
| JP | 2002245350 A | 8/2002 |
| JP | 2002279103 A | 9/2002 |
| JP | 2002329249 A | 11/2002 |
| JP | 2002335336 | 11/2002 |
| JP | 2002345030 A | 11/2002 |
| JP | 2002353885 A | 12/2002 |
| JP | 2003016041 A | 1/2003 |
| JP | 2003016093 | 1/2003 |
| JP | 2003518885 A | 6/2003 |
| JP | 2003187083 A | 7/2003 |
| JP | 2004004157 A | 1/2004 |
| JP | 2004005044 A | 1/2004 |
| JP | 2004135229 A | 4/2004 |
| JP | 2004185197 | 7/2004 |
| JP | 2004220546 | 8/2004 |
| JP | 3609398 | 1/2005 |
| JP | 2005078325 A | 3/2005 |
| JP | 2005519407 A | 6/2005 |
| JP | 2005198021 A | 7/2005 |
| JP | 2006505966 A | 2/2006 |
| JP | 2007527570 A | 9/2007 |
| JP | 2008514743 A | 5/2008 |
| JP | 2010178027 A | 8/2010 |
| KR | 200072521 | 12/2000 |
| KR | 20010078968 | 8/2001 |
| KR | 20020039648 | 5/2002 |
| KR | 2003-0042660 | 6/2003 |
| KR | 1020030050565 | 6/2003 |
| KR | 20030078446 | 10/2003 |
| RU | 2165679 C1 | 4/2001 |
| RU | 2169437 C1 | 6/2001 |
| RU | 2191482 C1 | 10/2002 |
| RU | 2212057 | 9/2003 |
| RU | 2232483 C2 | 7/2004 |
| TW | 161301 | 6/1991 |
| TW | 388021 B | 4/2000 |
| TW | 466858 B | 12/2001 |
| TW | 499645 B | 8/2002 |
| WO | WO-9308545 A1 | 4/1993 |
| WO | WO-9703410 A1 | 1/1997 |
| WO | 9745814 | 4/1997 |
| WO | WO-9726739 A1 | 7/1997 |
| WO | WO-98021676 | 5/1998 |
| WO | 9952077 | 4/1999 |
| WO | WO-9931610 A1 | 6/1999 |
| WO | WO-9941861 A1 | 8/1999 |
| WO | 9960801 A1 | 11/1999 |
| WO | WO-0002112 A2 | 1/2000 |
| WO | 0079451 | 6/2000 |
| WO | WO-0031672 A1 | 6/2000 |
| WO | 0043962 A1 | 7/2000 |
| WO | WO-0056033 A1 | 9/2000 |
| WO | WO-0103410 A1 | 1/2001 |
| WO | 0118694 A2 | 3/2001 |
| WO | WO-0143390 A2 | 6/2001 |
| WO | 0149048 A1 | 7/2001 |
| WO | 0150305 A2 | 7/2001 |
| WO | WO-0163900 A1 | 8/2001 |
| WO | WO-01063532 | 8/2001 |
| WO | WO-0169891 A1 | 9/2001 |
| WO | WO-0197104 A1 | 12/2001 |
| WO | WO-0203219 A1 | 1/2002 |
| WO | WO-0231718 A1 | 4/2002 |
| WO | WO-02044892 | 6/2002 |
| WO | WO-02067600 A1 | 8/2002 |
| WO | 02073934 A2 | 9/2002 |
| WO | 02093361 A1 | 11/2002 |
| WO | 02103459 A2 | 12/2002 |
| WO | 03032618 A1 | 4/2003 |
| WO | WO-03050743 A1 | 6/2003 |
| WO | 03075584 A2 | 9/2003 |
| WO | 03079256 A1 | 9/2003 |
| WO | 03085943 A1 | 10/2003 |
| WO | 2004003708 A2 | 1/2004 |
| WO | 2004084526 A2 | 9/2004 |
| WO | 2005008383 A2 | 1/2005 |
| WO | WO-2005004456 A1 | 1/2005 |
| WO | WO-2005020027 A2 | 3/2005 |
| WO | 05069917 | 8/2005 |
| WO | 2006130539 A2 | 12/2006 |

OTHER PUBLICATIONS

How can wireless models help my business?. Computer Weekly [serial online]. Dec. 2, 2003;:30. Available from: Business Source Complete, Ipswich, MA. Accessed Jul. 1, 2013.*
International Search Report, PCT/US05/001583, International Search Authority, European Patent Office, Nov. 21, 2006.
Anonymous, "BPM in Action: iUNIVERSE," Intelligent Enterprise, San Mateo, May 15, 2004, vol. 7, Issue 8, 2 pages (recovered from ProQuest on Jun. 5, 2009).
Anonymous: "BREW TM Application Note: Developing BREW Applications for Devices with RUIM Units", May 14, 2005, May 14, 2005 (May 14, 2005), pp. 1-11, XP007920607, Retrieved from the Internet: URL:http://web.archive.org/web/20050514075656/ http://brew.qualcomm.com/brew_bnry/pdf/developer/resources/ds/ Dev_BREW_Apps.pdf.
Anonymous: "Internet Archive Wayback Machine", Internet Citation, May 14, 2005 (May 14, 2005), p. 1, XP007920684, Retrieved from the Internet: URL:http://wayback.archive.org/web/ 2005061500000007*/http://brew.qualcomm.com/brew_bnry/pdf/developer/resources/ds/Dev_BREW_Apps.pdf [retrieved on Jun. 4, 2012].
Arar, Yardena, "Download apps to a phone," PC World, Jun. 2002, v20i6 pp. 64, Proquest #120993020 3 pgs.
Atsuyuki Morishima, "Efficient Construction of Materialized XML Views With Silkroute", IPSJ SIG Notes, Japan, Information Processing Society of Japan, Jul. 17, 2001, vol. 2001, No. 70, pp. 421-428.
Business Wire, "Informix Announces Key Customer Wins in Fourth Quarter; Leading Companies and Government Entities in Key Markets Around the World Respond to Informer's Technology Strategy", Business/Technology Editors. Business Wire. New York: Jan. 27, 1999, p. 1-8.
Butrico M A et al: "Gold Rush: Mobile Transaction Middleware With Java-Object Replication" Conference on Object-Oriented Technologies, (Jun. 16, 1997), pp. 91-101.
Classified Ad 3—No Title, New York Daily Times (1851-1857); Nov 15, 1853; ProQuest Historical Newspapers: The New York Times (1851-2008) p. 4.
Classified Ad 74—No Title. Chicago Daily Tribune (1923-1963); Oct 11, 1959; ProQuest Historical Newspapers: Chicago Tribune (1849-1989) p. G34.

(56) References Cited

OTHER PUBLICATIONS

"Ellipsus' Mobile Aplication Provisioning System", Internet Citation, Dec. 2, 2001 (Dec. 2, 2001), XP002266188, Retrieved from the Internet: URL: web.archive.orgfwww.ellipsus.com [retrieved on Jan. 7, 2004].
EPO: "Notice From the European Patent Office dated Oct. 1, 2007 Concerning Business Methods", Journal of the European Patent Office—Vol. 30, No. 11, Nov. 1, 2007 (Nov. 1, 2007), pp. 592-593, XP007905525, ISSN: 0170-9291.
European Search Report—EP12166425—Search Authority—Hague—dated Jun. 4, 2012.
European Search Report—EP12166426—Search Authority—Munich—dated May 22, 2012.
Fujii, H. "BREW application, flexibility in development comparable to PCs, powerful in enterprise system cooperation of cellular phones," Solution IT, vol. 14, No. 11, Japan, RIC Telecom, Nov. 1, 2002, pp. 22-24.
Goldenberg-Hart, Diane, "A Glossary of Selected Internet and Computing Terms," Yale University Library, Jun. 1996. Retrieved from http://www.library.yale.edu/ref/internet/intgloss.htm.
M2 Presswire. Convergys: Genie Mobile chooses Geneva Billing software, continuing the momentum of the merger between Convergys and Geneva Technology. Coventry: Jun. 1, 2001, p. 1.
No Author, "AvantGo 4.0 Powers Wireless Applications and Services", Customer Inter@ction Solutions, May 2001, vol. 19, Issue 11, p. 71.
No Author, "Sony Pictures to Sell Movies via Internet," Jul. 9, 2001, Source: Japan Computer Industry Scan.
Oommen P., "Over the Air Handset Management," Emerging Technologies Symposium, Broadband, Wireless Internet Access, 2000, IEEE Apr. 10-11, 2000, Piscataway, NJ, USA, IEEE, Apr. 10, 2000 (Apr. 10, 2000), pp. 1-4, XP010538894, ISNB: 0-7803-6364-7.
PR Newswire. China Unicom Selects Qualcomm's BREW Solution as Its Platform to Launch Wireless Data Applications. New York, Aug. 26, 2002, p. 1.
PR Newswire, "Diebold Teams with Health System Services to Offer a Complete Distribution Package for Pharmacy Medication and Supplies" . New York: May 28, 1998. p. 1-3.
Qualcomm; "Binary Runtime Environment for Wireless, BREW Application note: Developing BREW Applications for Devices with RUIM Units" (Online) Jan. 10, 2005, pp. 1-11, XP002410586 San Diego Retrieved from the internet: URL:http://brew.qualcomm.com/brew_bnry/pdf/developer/resources/ds/Dev_BREW_Apps.pdf> [retrieved on Dec. 6, 2006].
Qualcomm Incorporated, "BREW Distribution System (BDS) Overview" Internet Citation, (Online) 2003, Retrieved from the Internet: URL: http://www.wirelessknowledge.com/brew/images/about/pdf/bds.pdf> (retrieved on Dec. 6, 2006), pp. 1-17.
Rigdon, Joan E., "CyberSource Begins to Offer Software of Symantec and Others on the Internet," Wall Street Journal, Jan. 31, 1995.
Supplementary European Search Report—EP05722457—Search Authority—The Hague—dated Nov. 12, 2009.
SYNCML Consortium: "SYNCML Sync Protocol, Version 1.0" (Dec. 7, 2000), Chapters 1,2,5-8.
SYNCML Consortium: "SYNCML Sync Protocol, Version 1.0.1" (Jun. 15, 2001).
Telesens: TelesensKSCL and Comptel sign strategic agreement; New alliance expands best of suite billing offering and furthers drive towards comprehensive next generation solution for network service providers M2 Presswire, Coventry, Nov. 28, 2000, p. 1.
USA Group Selects Click-N-Done for Electronic Bill Presentment and Payment; Software Will Support Online Presentment and Payment for Education Loan Borrowers Business Editors, Internet Writers. Business Wire. New York: Apr. 24, 2000. p. 1.
Written Opinion—PCT/US05/001583, International Search Authority, United States Patent and Trademark Office, dated Nov. 21, 2006.
"SYNCML Representation Protocol, Version 1.0" SYNCML Representation Protocol, (Dec. 7, 2000), pp. 1-104, Chapters 1-4.
Floyd R, et al., "Mobile Web Access Using Enetwork Web Express", IEEE Personal Communications, IEEE Communications Society, US, vol. 5, No. 5, Oct. 1, 1998 (Oct. 1, 1998) , pp. 47-52, XP000786616.
Seifert A., et al. "A Multi-Version Cache Replacement and Prefetching Policy for Hybrid Data Delivery Environments," Proceeding VLDB '02 Proceedings of the 28th international conference on Very Large, Jan. 1, 2002, pp. 850-861, XP055148735.

\* cited by examiner

APPLICATION-BASED VALUE BILLING IN A WIRELESS SUBSCRIBER NETWORK

CROSS-REFERENCE TO RELATED APPLICATIONS

This application claims priority under 35 U.S.C. § 119(e) on U.S. Provisional Patent Application No. 60/538,206 filed on Jan. 21, 2004. The disclosure of which is incorporated herein by reference in its entirety.

BACKGROUND OF THE INVENTION

1. Field

The present invention generally relates to communications between remote computing devices and servers. More particularly, the invention relates to the creation and sending of billing events between a server and a remote client device.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. However, these smaller and more powerful personal computing devices are typically severely resource constrained. For example, the screen size, amount of available memory and file system space, amount of input and output capabilities and processing capability may each be limited by the small size of the device, and in particular, the small size of the user input unit, e.g., the keyboard. Because of such severe resource constraints, it is often typically desirable, for example, to maintain a limited size and quantity of software applications and other information residing on such remote personal computing devices (client devices).

Some of the personal computing devices utilize application programming interfaces (APIs), sometimes referred to as runtime environments and software platforms, that are installed onto their local computer platform and which are used, for example, to simplify operations of such devices, such as by providing generalized calls for device specific resources. Further, some such APIs are also known to provide software developers the ability to create software applications that are fully executable on such devices. In addition, some of such APIs are known to be operationally located between the computing device system software and the software applications such that the computing device computing functionality is made available to the software applications without requiring the software developer to have the specific computing device system source code. Further, some APIs are known to provide mechanisms for secure communications between such personal devices (i.e., clients) and remote devices (i.e., servers) using secure cryptographic information.

Examples of such APIs, some of which are discussed in more detail below, include versions of the Binary Runtime Environment for Wireless® (BREW®) developed by QUALCOMM Incorporated, of San Diego, Calif. BREW® can cooperate with a computing device's (e.g., a wireless cellular phone) operating system, and can, among other features, provide interfaces to hardware features particularly found on personal computing devices. BREW® can also provide these interfaces on such personal computing devices at a relatively low cost with respect to demands on device resources and with respect to the price paid by consumers for devices containing the BREW® API. Additional features of BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security and application distribution functionality, and the client performs, for example, application execution, security and user interface functionality.

The enhanced computing capabilities and security features in client devices has enabled applications to be purchased directly from a carrier network and downloaded and installed on a client device. Once an application is purchased, a remote billing system can automatically generate billing to a subscriber/account associated with the client device and can distribute the appropriate payment to the developers/publishers. However, current wireless server-client systems provide for limited purchased options. Typically, a one-time purchase or a fixed number of uses can be purchased for a desired application or content. This results in limited flexibility for developers and content providers to package or up-sell their applications.

The foregoing description of the related art is merely intended to provide an overview of some of the known uses of APIs and as an introduction to the BREW® platform, which can be used in embodiments of the invention. However, the invention is not to be construed as being limited to a specific implementation, operating platform or environment.

SUMMARY OF THE EXEMPLARY EMBODIMENTS

Exemplary embodiments of the present invention are directed to systems and methods for generating and processing client device generated billing requests in a wireless network.

Accordingly, an embodiment of the invention can include a method for application-based billing in a wireless subscriber billing system, the method comprising: generating a billing request within a client device; transmitting the billing request including a subscriber identification (SID) to the billing system; generating a validation response to the billing request at the billing system; and transmitting the validation response to the client device.

Another embodiment of the invention can include an apparatus comprising: a wireless client device, including an application configured to generate and transmit a billing request and configured to receive a validation response; a billing server configured to receive the billing request and transmit the validation response; and validation logic configured to generate the validation response in response to the billing request.

Another embodiment of the invention can include a client device comprising: a transceiver capable of wirelessly transmitting and receiving data; a user interface; and an application configured to generate a billing request; to transmit the billing request to a billing system using the transceiver; and to receive a validation response associated with the billing request from the billing system.

Another embodiment of the invention can include a billing system comprising: a transceiver capable of wirelessly transmitting and receiving data; a billing server operably coupled to the transceiver, wherein the billing server is configured to receive a billing request including a subscriber ID (SID) from a client device and to transmit a validation response to the client device; and validation logic configured to generate the validation response in response to the billing request.

Another embodiment of the invention can include a computer-readable medium on which is stored a computer program for wirelessly communicating application-based billing requests, the computer program comprising instructions which, when executed by at least one computing device on a wireless client device, causes the computing device to perform the process of: generating a billing request at the wireless client device; transmitting the billing request to a billing system; and receiving a validation response associated with the billing request from the billing system.

Another embodiment of the invention can include a billing system, comprising: means for generating a billing request within a client device; means for transmitting the billing request including a subscriber identification (SID) to a billing server; means for generating a validation response to the billing request at the billing server; and means for transmitting the validation response to the client device.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION OF THE PREFERRED EMBODIMENTS

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

One or more embodiments of the invention can be used in conjunction with a runtime environment (e.g., API) executing on the computing device. One such runtime environment (API) is Binary Runtime Environment for Wireless® (BREW®) software previously discussed. However, one or more embodiments of the invention can be used with other types of runtime environments (APIs) that, for example, operate to control the execution of applications on wireless client computing devices. Additionally, "API" is intended to be construed broadly as a stand alone program or portion of a program that is used to achieve a particular function and can be used interchangeably with the terms "application", "program", "routine", "instructions" and "applet".

Figure 1:
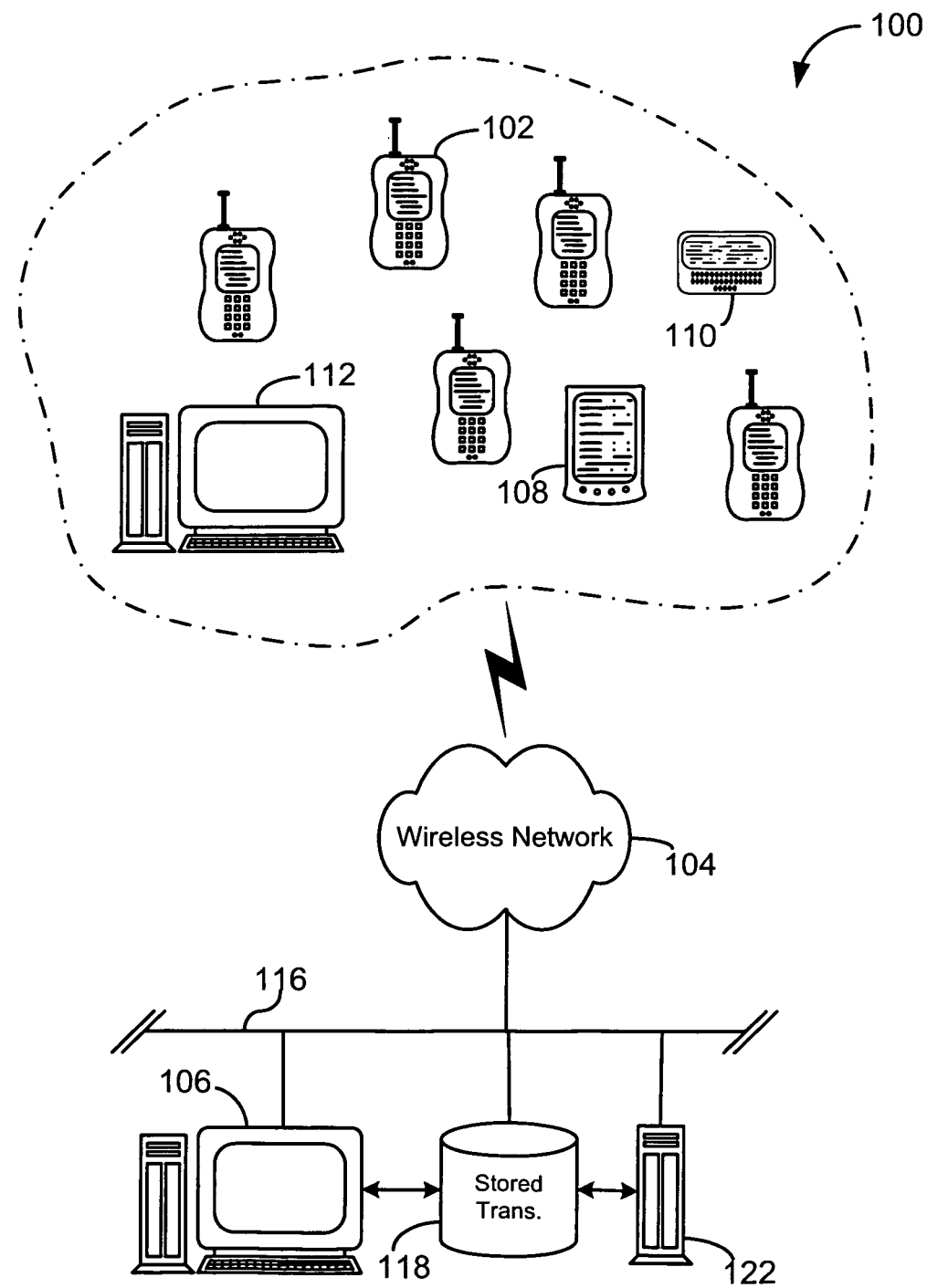
FIG. 1 is a diagram of a wireless network architecture that supports the client devices and servers in accordance with at least one embodiment of the invention.

FIG. 1 illustrates a block diagram of one exemplary embodiment of a wireless system 100 in accordance with at least one embodiment of the invention. System 100 can contain client devices, such as cellular telephone 102, in communication across a wireless network 104 with at least one billing server 106 that receives billing events from wireless devices across a wireless communication portal or other data access to the wireless network 104. As shown here, the wireless (client) device can be a cellular telephone 102, a personal digital assistant 108, a pager 110, which is shown here as a two-way text pager, or even a separate computer platform 112 that has a wireless communication portal. The embodiments of the invention can thus be realized on any form of client device including a wireless communication portal or having wireless communication capabilities, including without limitation, wireless modems, PCMCIA cards, personal computers, access terminals, telephones, or any combination or sub-combination thereof.

The billing server (BDS) 106 is shown here on a network 116 with other computer elements in communication with the wireless network 104. There can be additional stand alone servers (e.g., stand-alone server 122), and each server can provide separate services and processes to the client devices 102, 108, 110, 112 across the wireless network 104.

There is preferably also at least one stored transaction database 118 that holds records of billing related transactions from wireless devices 102, 108, 110, 112. However, those skilled in the art will appreciate that the configuration illustrated in FIG. 1 is merely exemplary. Accordingly, embodiments of the invention can include one or more servers that can each perform all the described functions and contain all necessary hardware and software, or can contain only selected functionality.

Figure 2:
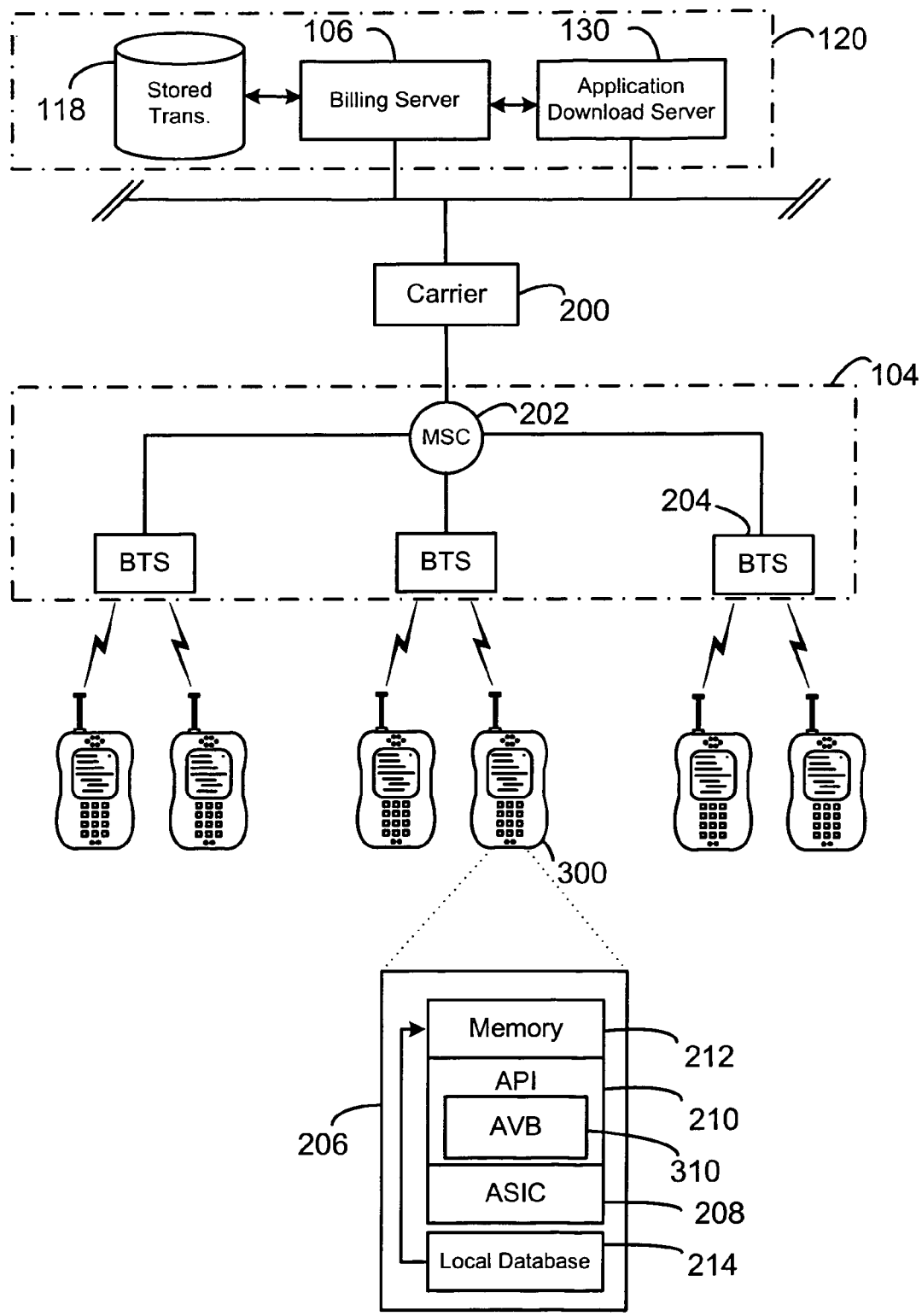
FIG. 2 is a more detailed diagram of a wireless network architecture that supports the client devices and servers in accordance with at least one embodiment of the invention.

In FIG. 2, a block diagram is shown that more fully illustrates system 100, including the components of the wireless network 104 and interrelation of the elements of the exemplary embodiments of the invention. System 100 is merely exemplary and can include any system that allows remote client devices, such as wireless client computing devices 300, 102, 108, 110, 112 to communicate over-the-air between and among each other and/or between and among components connected via a wireless network 104, including, without limitation, wireless network carriers and/or servers. The billing server 106 and the stored transaction database 118, along with any other servers such as application download server 130, which are used to provide cellular telecommunication services, communicate with a carrier network 200, through a data link, such as the Internet, a secure LAN, WAN, or other network. In the embodiment shown, a single server 120 can include the application download server 130, billing server 106 and the stored transaction database 118. Additionally, the server 120 can be directly coupled to the carrier network or contained therein. However, these servers can also be independent devices.

The carrier network 200 controls messages (typically sent as data packets) sent to a messaging service controller ("MSC") 202. The carrier network 200 communicates with the MSC 202 by a network, the Internet and/or a public switched telephone network (PSTN). Typically, the network or Internet connection between the carrier network 200 and the MSC 202 transfers data, and the PSTN transfers voice information. The MSC 202 can be connected to multiple base stations ("BTS") 204. In a similar manner to the carrier network, the MSC 202 is typically connected to the BTS 204 by a network, the Internet and/or PSTN for data transfer and/or voice information. The BTS 204 can broadcast data messages wirelessly to the client devices, such as client device 102, by short messaging service ("SMS"), or other over-the-air (OTA) methods known in the art.

The client device 300, e.g., a cellular telephone, has a computer platform 206 that can receive and execute software applications and transmit billing requests from an application to the billing server 106. Additionally, client device 300 can communicate with application download server 130. The computer platform 206 can include an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The API 210 (e.g., BREW®) also has operating thereon an application-based value billing (AVB) application 310 containing logic configured to process special billing requests from the client device to the billing server 106, via carrier network 200. The computer platform 206 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like.

The wireless client device 300, such as a cellular telephone, has installed on it, or otherwise downloads, one or more software applications, such as games, news, stock monitors, and the like. For example, the client device 300 may receive one or more software applications downloaded from the application download server 130. The software applications may be stored on the local database 214 when not in use. The client device 300 or other wireless computing device may upload resident applications stored on the local database 214 to memory 212 for execution on the API 210 when so desired by the user or invoked by another API. In this manner, in one embodiment, an AVB application 310 can be loaded on client device 300 for execution of the application and generation of billing requests to the billing server 106.

As used herein the terms "client device", "wireless device", "wireless computing device", "client computing device" and variations thereof are interchangeable and each includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to billing information communicated between a client device 300 and a billing server 106. The client device 300 can be serviced by at least one remote billing server 106 with respect to processing the billing requests generated at the client device 300. Some examples of client devices which may be used in accordance with embodiments of the present invention include cellular telephones or other wireless communication units, PDAs, paging devices, handheld navigation devices, handheld gaming devices, music or video content download units, and other like wireless communication devices.

The wireless communication between the client device 300 and the BTS 204 can be based on different technologies, such as code division multiplexed access (CDMA), time division multiplexed access (TDMA), frequency division multiplexed access (FDMA), the global system for mobile communications (GSM), or other protocols that may be used in a wireless communications network or a data communications network. The data communication is typically between the client device 300, BTS 204, and MSC 202. The MSC 202 can be connected to multiple data networks such as the carrier network 200, PSTN, the Internet, a virtual private network, and the like, thus allowing the client device access to a broader communication network. As discussed in the foregoing, in addition to voice transmission, data can be transmitted to the client device via SMS or other OTA methods known in the art.

Developers have invested extensive efforts to create consumer affinity for their applications and brands. Many developers believe customers would be willing to make incremental purchases beyond just an initial buy of an application, providing more value to consumers and creating new revenue opportunities for, developers, publishers, and wireless operators. For example, developers can generate applications that include additional features (e.g., improved weapons or additional levels in a game) that can be enabled by a separate purchase from the initial application purchase. Accordingly, a developer can derive increased revenue from these application-based purchases. In addition some applications, such as ringer managers, actually use content (e.g., the ringers themselves, which can be music from recording artists and the like). This content can also be purchased and delivered to the client device and can be installed on the client device in separate transactions. The billing and enabling of the requested service (e.g., addition weapon or delivery of content) can be separate events.

To facilitate an understanding of the disclosure, definitions are provided for some of the terms. Generally, an application is a software program that performs actions based on consumer direction and interaction. Thus, an application potentially behaves differently each time it is used.

A handler is an application that supports rendering of content. It is typically pre-installed on a device and can support one or more content types. Typically, a handler does not interact with the consumer but instead works behind the scenes to launch the content. However, some handlers support simple interaction with a consumer, such as, "Do you want to make this ringer your default?"

Content (or static content) is generally a software file that is displayed to the consumer via an application, interpreter, or handler. The content file typically does not contain any conditional/executable software logic. Typical content types include pictures, videos, browser pages, ringers, and text files.

An application-based value billing (AVB) request is a billing request that is generated in an application on a client device. The AVB request may also be referred to as a value billing request or simply a billing request. Likewise, the billing event generated from the AVB request may be referred to as an AVB event, a value billing event, or simply a billing event.

The foregoing definitions are basic and should not be considered all-inclusive. For example, an application can perform actions based on specific device parameters and settings in addition to consumer/subscriber interaction. Accordingly, other aspects of the terms are within the intended scope of the definitions and invention, as will be appreciated by those skilled in the art.

Figure 3:
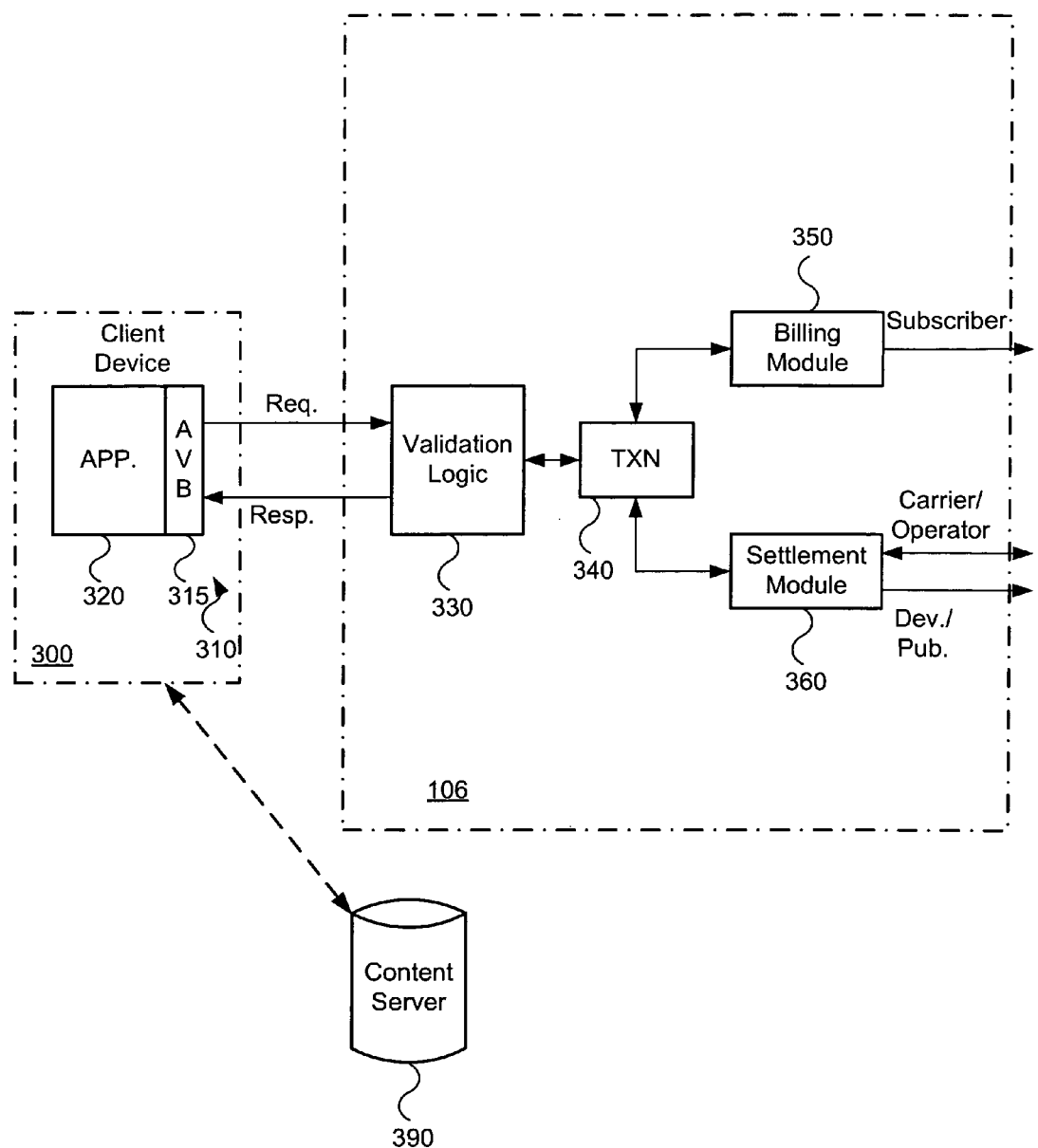
FIG. 3 is a system level illustration of an application-based value billing system in accordance with at least one embodiment of the invention.

Referring to FIG. 3, application-based value billing (AVB) can be considered the ability of an application 320 (e.g., a BREW® application) on a client device 300 to submit a billable event (e.g., via an AVB extension 315) to a billing server (BDS) 106 for billing processing. The application 320 and related AVB extension 315 can be considered a AVB application 310 that includes the ability to generate and process billing events at the client device 300. These value billing events can be propagated through the BDS 106 to billing module 350 (e.g., an operator's subscriber bill generation system) and a settlement module 360 (e.g., BREW® Billing services), which supports consumer billing, developer payment, operator revenue-sharing, and settlement revenue-sharing. AVB services typically do not require content distribution to the client device 300 or the enabling of services related to value billing on the client device 300. Therefore, the BDS 106 does not necessarily enforce license management services related to the AVB. It is the responsibility of the AVB application 310 to submit a value billing request, process a validation response, and enable the service upon the receipt of a successful validation response. This local control of the license management allows developers to customize their pricing and/or licensing, as desired without having to conform to predefined rules (e.g., one-time charge, subscription billing, and the like) enforced by the BDS 106.

As noted above, the billing services can be extended directly to the AVB application 310. Accordingly, AVB application 310 can initiate billing events after the initial application download transaction, in which the AVB application 310 is downloaded. The AVB application 310 may offer additional services (post-application download) for an additional cost to the subscriber/consumer. Because of the financial implications, these billing-enabled applications (e.g., AVB application 310) can use special protected application interfaces that relate to billing on the BDS 106. For example, AVB applications can access and use billing interfaces, download interfaces, and mutual authentication interfaces to utilize billing via BDS 106. These interfaces can be accessed via calls to AVB extension 315, which can be distributed to developers for integration with applications, as discussed in greater detail below.

AVB applications generate value billing for services in numerous ways. For example, gaming developers can provide services beyond the basic applications. These services may be incremental and range from enhanced levels of games, e.g., new golf courses in golf games, to more features, and the like. Typically, these services are offered to the subscriber through the AVB application 310. After the subscriber confirms the purchase, the AVB application 310 can initiate a billing request and transmit the billing request to BDS 106 for processing and billing the purchase. This capability offers the flexibility for application developers to appeal to a broader audience with a lower entry application cost and/or differentiated pricing for services while running the AVB application 310.

Another example can be a ring tone shopping application. Currently, typical ring tone applications utilize the purchase/number of uses pricing model. A use equates to one ring tone download. However, using an AVB application 310 and value billing at BDS 106, the ring tone supplier can differentiate pricing across ring tones. For example, popular ring tones may be priced differently from other ring tones.

Additionally, an AVB application can be priced as a monthly subscription with embedded value billing services billed as incremental charges based on the billing requests generated by the AVB application. The value billing charges generated by the AVB application can be handled independently from the AVB application charge (e.g., a one time download charge for installing the AVB application on a client device). Typically, each value billing request is considered a one-time purchase event, and there does not have to be a billing relationship between the value billing event and a download event from BDS.

The AVB application 310 can set the billing attributes to include among other items, a billing description and a billing amount, e.g., customer list price (CLP), and other billing data that is associated with the subscriber ID (SID) associated with the client device 300 and the AVB application 310 that generated the billing request (AVB request). This billing data is sent to the BDS 106, in the AVB request. The AVB request can be processed and validated utilizing validation logic 330. Validation logic 330 can be configured by the carrier/operator and is used to approve or deny the AVB request. For example, an operator may issue a denial of AVB requests with billing amounts greater than fifty dollars, or may issue a denial of AVB requests from specific SIDs. Additionally, the validation logic 330 may access prepay interfaces, if the SID is associated with a prepay account, to check the balance in the prepay account for sufficient funds, for example. Once the AVB request has been approved, an AVB billing event can be propagated through the BDS 106. Additionally, AVB billing events can be included in reports to the operator and/or developer for bill processing, customer service support, business intelligence, payment reconciliation support, and the like.

The AVB application 310 can be pre-installed on the client device 300 or downloaded in a conventional manner. For example, the consumer/subscriber can browse a catalog, select and purchase an AVB application 310 for download. The consumer can then be asked to confirm the purchase, and can be notified that there may be additional service/content fees associated with the AVB application 310. The AVB application 310 can then be downloaded and the purchase transaction logged, in a conventional manner. Then, at some point during the use of the AVB application 310, it can present the opportunity to purchase a "value-added service". The AVB application 310 can utilize carrier, platform, language, prepay information, and/or environment (e.g., BREW® 3.0) to determine relevant value-added services available and pricing. The AVB application 310 can display to the consumer additional priced services, for example, a new weapon for $0.25 or an MP3 song for $1.00. The value-added items and prices can be stored locally as part of the core application and/or the AVB application 310 can connect to a developer's content server 390 or other remote server.

As discussed above, the service (value-added service) could already be in AVB application 310 (e.g., extra level of a game) or require a connection to a content server 390. The AVB application 310 can then request consumer billing authorization (i.e., generate an AVB request). The client device 300 contacts the BDS 106 for purchase approval (e.g., makes a network connection). The BDS 106 responds with approval or denial, or there is no response. Based on the response, the AVB application 310 can unlock the local service, contact the content server 390, or deny the service requested. The AVB application 310 can mark the transaction as pending or abandon the transaction if there is no response, after a predetermined time and/or number of retries. The client device 300/AVB application 310 can contact the content server 390, if it needs content not present in the AVB application 310. If the AVB application 310 cannot retrieve the content, the application can queue for a retry since the service purchase was committed. Typically, once the billing request is approved, a billing event is generated and propagated through the BDS 106 and the subscriber bill is generated.

At least one embodiment of the invention is illustrated in FIG. 3. A client device 300 is illustrated that includes an AVB application 310. The AVB application 310 can include an application 320 (e.g., a BREW® application) that includes an AVB extension 310 (e.g., an API that enables billing requests and processing within the application). Accordingly, the billing request is generated within client device 300 (e.g., in the AVB application 310). This allows the shopping experience to be controlled at the client device level and for greater flexibility in the licensing, distribution and pricing of applications, features in applications and/or content. For example, a developer may wish to provide an arcade-type application, with various features each having different price levels. These features may be included with the original application (e.g., different levels of difficulty) or may be downloaded from a remote content server 390 (e.g., enhanced background music). The option to purchase each service (e.g., additional feature, content) can be presented to the user and the user can determine whether or not to purchase each service at the application level. Accordingly, one AVB application 310 can generate additional incremental billing for the developer and carrier, without the need of multiple applications and/or multiple downloads of the different applications.

In contrast, to achieve a similar functionality using conventional systems, the application developer would need to generate different applications for each feature and/or pricing level and make them available for download. Conventional systems record the billing information and process the settlements for each application downloaded. This process is controlled by the carrier and to purchase each application the client device would have to connect to the carrier network to browse the application catalog and purchase the desired application with the desired features.

In at least one embodiment of the invention, as stated above, the shopping experience is conducted at the client device 300. Accordingly, after a purchase option is presented and accepted at the client device 300, a billing request is generated within the client device 300. The billing request includes information used to process the billing transaction (e.g., SID) and can be transmitted to a remote billing server (e.g., BDS 106). The billing request is received at the BDS 106 and processed. A validation response is generated by validation logic 330 in response to the billing request at the BDS 106. Then, the validation response is transmitted to the client device 300.

The validation response can be an approval of the billing request or a denial of the billing request. Once the client device receives the response, it can process the validation response. For example, the service (e.g., enabling an additional feature of a game) linked to the billing request can be activated, if the validation response is positive. Likewise, if the billing request is denied, an indication of the denial of the billing request can be displayed on the client device. Optionally, additional information can be included in the denial, such as the reason why the request was denied (e.g., insufficient funds).

In at least one embodiment, the BDS 106 can leverage existing billing components to facilitate implementation of an application-based value billing system. For example, in FIG. 3, BDS 106 can receive the billing request from the client device 300. The BDS 106 can then access validation logic 330 that can be determined by the billing entity (e.g., an operator/carrier). The validation logic 330 can be as detailed or as limited as desired. For example, a carrier may allow all billing events to be processed as long as the SID is valid, using default amounts and payee information. However, typically validation checks can include that the requested billing amount is valid and enough information is provided to generate a billing event (e.g., price for the service, AVB application ID, short description of the requested service, and the like). This information can be included in the billing request directly or can be generated in combination with stored information in the BDS 106 or other server operably coupled to the BDS 106. For example, an application ID can be linked to one or more supplier IDs and related supplier pricing, description of the application, list price (CLP), pricing plan, and the like. However, typically at least SID, price (CLP) and a short description of the service requested will be transmitted from the client device 300/AVB application 310, since the price displayed for the service during the client-based purchase transaction that generates the billing request is typically the price used for subscriber billing.

Typically, as stated above, the billing request can include or be associated with the SID, a short description of the service requested (short description), and a price for the service (CLP). Additional information can also be transmitted with the billing request including at least one of application ID, transaction ID, submit time, create time, currency, long description, payee ID, vendor data, SID hash, platform, language, environment (e.g., BREW® 3.0) and the like. The additional data can be used by the operator and/or the developer as will be appreciated by those skilled in the art.

For example, the transaction ID can be a unique code used to prevent multiple billing events for the same billing request/transaction. In the wireless environment, interruptions in the communication paths can cause disruption of the data communication between the billing server and client device. Accordingly, a billing request could be received and approved by the billing server, but the approval may not be received by the client device. The transaction ID can then be used to prevent duplicate billing, if the client device resubmits the billing request, since the transaction ID will be the same for both requests.

Further, the SID hash can be a unique identifier associate with the SID, but not identifiable back to the SID. The SID hash can then be transmitted to developers/or other third parties for added business/marketing intelligence without jeopardizing the privacy of the subscriber associated with the SID. For example, using a SID hash, it is possible to determine that a particular subscriber purchased multiple value services from an AVB application. However, the SID hash prevents the identification of that particular subscriber.

Additionally, in embodiments of the invention, the validation logic 330 can perform additional checks to approve the billing request. For example, if the subscriber pricing plan is a prepay plan, the prepay balance can be checked to see if there is sufficient funds to purchase the service requested. If there are sufficient funds, then the approval is transmitted to the client device. However, if there are not sufficient funds, then the billing request is denied, even though the billing request itself is valid. Once the billing request is ultimately approved by the validation logic 330/billing server 106, the approval is transmitted to the client device 300 for processing by the AVB application 310 that generated the billing request.

Upon transmitting the approval to the client device 300, the transaction data is communicated to transaction manager (TXN) 340, which is configured to receive the transaction data. The TXN 340 can optionally associate additional billing information not included with the transaction data from the billing request. For example, the transaction data can contain the SID, description of the service requested (short description), and a price (e.g., CLP). The TXN 340 can associate additional data to complete the billing process (e.g., description of the item, application ID, pricing plan, and the like). Alternatively, the TXN 340 can process and pass through the transaction data received without any addition or modification. The TXN 340 then communicates this information as a billing event to a client billing module 350 and a settlement module 360. The client billing module 350 can be configured to receive the billing event from the TXN 340 and generate a bill to a subscriber associated with the SID and client device 300. The settlement module 360 can also be configured to receive the billing event from the TXN 340, to invoice the carrier/operator, receive payment from the carrier/operator and to pay a service supplier (e.g., developer, content provider, publisher and the like).

The billing event can be created and processed in a similar manner to conventional application download transactions, once the transaction data has been generated. For example, transaction data associated with the billing request/service purchased can be stored in the TXN 340 and/or related database (transaction database 118). The transaction data may include a subset of metadata stored in the TXN 340 or a related database and additional information included by other devices and/or systems. Billing events can be created in the TXN 340 by correlating the metadata and the transaction data or can be based solely on the transaction data received from the AVB application 310. Once a billing event is generated, it can be communicated along with the related reporting data (e.g., vendor data) and processed by the billing module 350 and settlement module 360, as discussed above. At least some data included in the billing request may not be processed. For example, the vendor data can be pass through data that is not processed other than to propagate the vendor data through the BDS 106 and/or related components.

Although illustrated as part of a common billing server/system BDS 106, the various components illustrated (e.g., validation logic 330, TXN 340, billing module 350 and settlement module 360) and/or functionalities described can be separated or combined as desired. Additionally, the various components and/or functionalities described can optionally reside on separate servers/computing devices that are operably coupled to each other via a wired or wireless network, Internet, PSTN, other known communication systems and combinations thereof.

Figure 4:
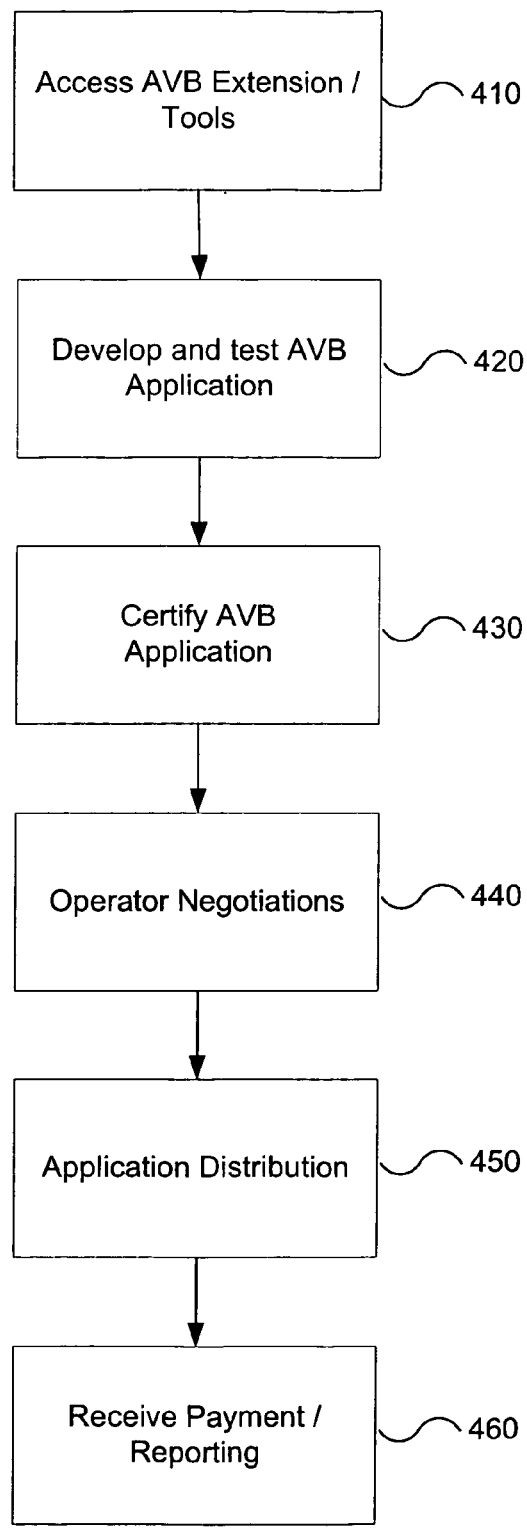
FIG. 4 is an illustration of an application-based value billing process from a developer perspective in accordance with at least one embodiment of the invention.

FIG. 4 illustrates the AVB process from a developer perspective. The developer can use AVB applications to increase revenue, broaden application distribution, and enhance licensing configurations. To develop an AVB application, the developer can retrieve value billing documentation and information necessary to develop a value billing application. This can include accessing programming guidelines, tools, and the public extensions (e.g., AVB extension 310) available from an owner/operator of the BDS 106, block 410.

The developer then builds an AVB application that incorporates a value-added service that can be sensitive to the active carrier, platform, language, prepay, and SID. Price management can be integrated into the AVB application as well as value billing transaction management services (AVB extension). The AVB application can be tested by the developer utilizing operating environment test tools (e.g., BREW® value-added test tools), block 420.

The application can then be submitted to a third-party test center or an operator test center with supplemental information that describes the value-added billing services and transaction management behavior of the AVB application. The test center can test and/or augment the AVB application for value billing. For example, the test center can verify that the AVB application transaction management appropriately handles approved, denied and no response condition from the BDS. In addition, the test center can exercise a subset of the value billing services to verify the interaction with a graphic user interface (GUI) on the client device. Platform (e.g., device type/operating system) and subscription based testing may also be included to examine the effect on value-added service offerings by platform and prepay/subscription type to certify the AVB application, block 430.

While the application is under development and/or during the test cycle, the developer and operator can discuss the AVB application, the value-added services, and the pricing of the AVB application and the value-added services. The operator may require a service level agreement (SLA) with the developer for uptime on network server access and price range agreements. After the AVB application is distributed, the developer may in some cases change the service pricing using a networked server (e.g., content server 390). However, the operators may require pricing within an agreed price range, block 440.

The AVB application pricing can be agreed to by the operator, who then can add the application to a catalog of applications available on the operator's network. As discussed above, once the AVB application is available in the operator's catalog for distribution, subscribers can browse for the AVB application and download the application, block 450.

After the application is distributed, the developer can manage the value-added services and associated pricing, if a network/content server controlled by the developer is used in the value-added services. As the AVB application generates value billing requests that are processed and approved, the developer can receive payments and AVB related reports from the BDS. Reports can be generated by the BDS that provides usage information for each value billing event and any associated adjustments, payments that relate to value billing services, and the like. For example, the BDS can generate payments based on the value billing services independently. Alternatively, the payments can be included in a lump sum with other developer payments, such as payments for application downloads. If payments are received in a lump sum, the payment report or other reports from the BDS can be used to identify AVB-based payments, block 460.

In addition to the billing data, vendor data can be transmitted with the billing request and propagated through the billing system. The data in the vendor data can be included with the developer report to provide the information programmed by the developer to correspond with particular AVB-based billing requests/purchases. For example, the data could indicate the number of uses of an application or feature, before a particular value-based service request was made. This data can be used with the other reporting data to allow developers to derive significant business intelligence from the AVB events, which can be used for pricing decisions, application design, features to enhance/remove, and the like.

From an operator perspective, AVB applications allow for new revenue opportunities. However, operator distribution control points that exist with application downloads may be modified. For example, the AVB application controls offering value-added services to the consumer and setting the list price. Typically, in the conventional access of applications from an operator's catalog, the operator controls the catalog and the consumer pricing of all the applications. For AVB applications, the operator does not have the same systematic consumer/subscriber shopping control. However, the operators can enforce control through direct discussions with developers (e.g., 440). Additionally, the validation logic (e.g., 330) can be controlled by the operator, so control over approving a billing request can still be exercised, even though pricing and other aspects are not directly controlled. As such, for value billing requests, the BDS 106 provides the operator avenues to validate all value billing requests through operator interfaces (e.g., validation logic 330).

Figure 5:
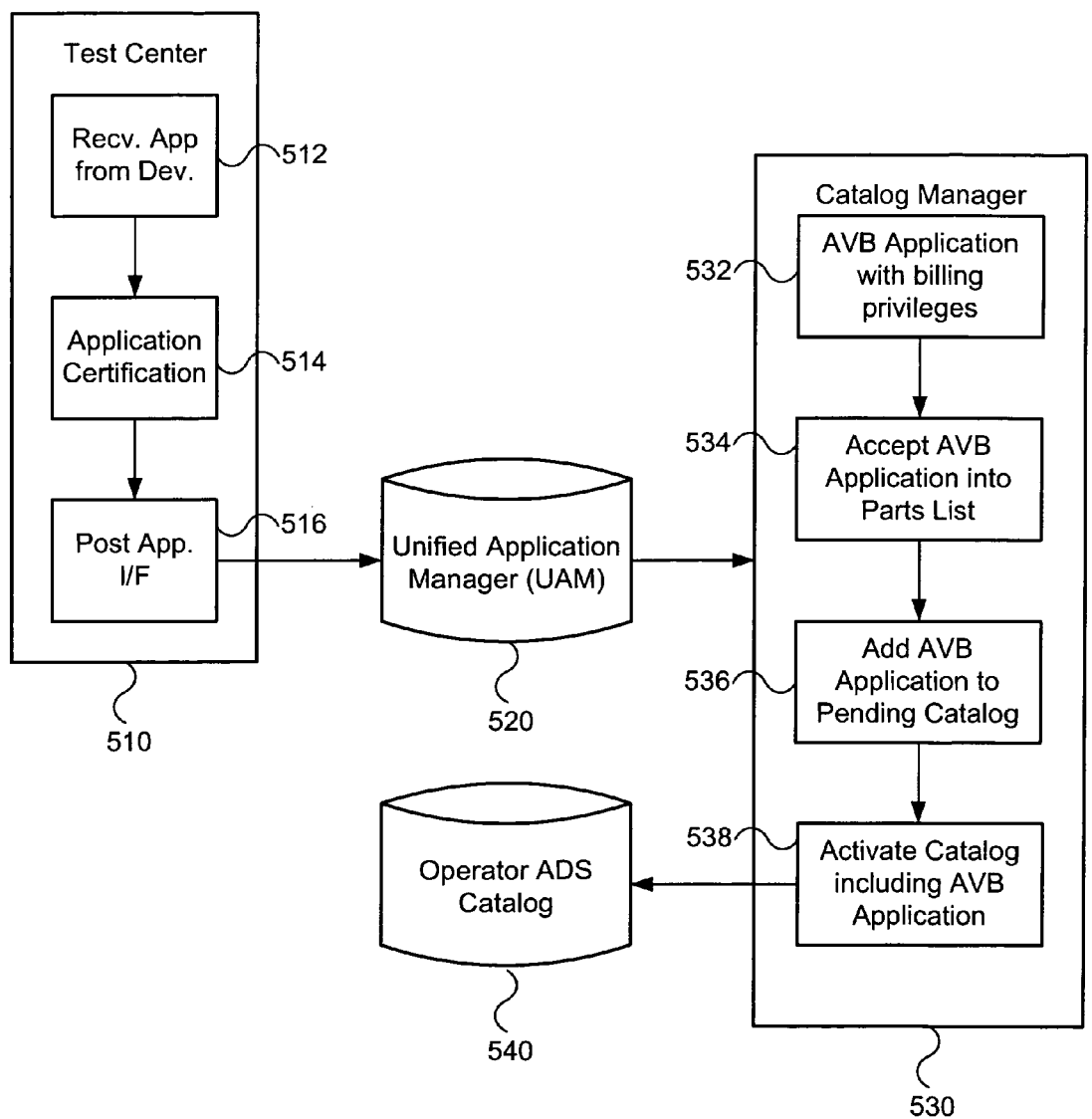
FIG. 5 is a system level illustration of adding application-based value billing applications to an operator catalog in accordance with at least one embodiment of the invention.

FIG. 5 provides a more detailed illustration a system for the acceptance and integration of an AVB application into a catalog manager 530 and operator's catalog 540 for distribution. In general, a test center 510 can contain logic 512 configured to receive an AVB application from a developer, logic 514 configured to certify the AVB application and logic 516 configured to post the certified AVB application to Unified Application Manager (UAM) 520. UAM 520 can store metadata related to the application for billing and reporting purposes, which can be accessed by the BDS (e.g., TXN) for processing billing transactions. The UAM 520 can communicate the AVB application to a catalog manager 530. The catalog manager 530 can include logic 532 configured to identify the AVB application based on privileges (e.g., access to billing services and the like) associated with the AVB application, logic 534 configured to accept the AVB application into a parts list, logic 536 configured to add the AVB application to a pending catalog, and logic 538 configured to activate a catalog including the AVB application. The activated catalog can be considered an operator ADS catalog 540. Catalog 540 can be considered a shopping catalog (e.g., hierarchical grouped folders, containing applications from the parts list) that can be accessed by the ADS and presented to the subscriber for browsing and downloading.

Upon acceptance of a value billing application into the parts list (e.g., list of items available for download), the operator can identify the AVB application because it has a dependency on the privileged value billing extensions. For AVB applications, each operator can optionally perform additional pre-commercial testing on the application to be satisfied with the GUI, pricing, performance, and value-added services that will be exposed to its subscribers. Due to varying business decisions of each operator/carrier, it is possible for an AVB application to pass the testing center tests, but not meet operator-specific guidelines for value billing. Accordingly, as part of the operator negotiation 440, developers should review each operator's guidelines to determine how to work with each specific operator on AVB applications.

As discussed above, the validation logic can be used to determine if a billing request is approved or denied. The validation logic can rely on various operator interfaces pertinent to value billing on the BDS (e.g., user authorization, validation transaction, and prepay service). User authorization can be used by the operator to approve or deny value billing requests at the SID level. For example, an operator may cap the value billing based an operator-defined threshold (e.g., fifty dollars). After the threshold is reached, the operator may then deny subsequent value billing requests for an indefinite or finite period of time, e.g., the remainder of the month. The validation transaction can be used by the operator to include any additional validation tests on the value billing request prior to prepay processing or returning an approved response. This additional validation logic may include, for example, verifying the billing amount does not exceed a threshold value for a single value billing event (e.g., ten dollars). Another example includes verifying that the requesting AVB application is not on an operator's value billing exclusion list due to post-distribution service and pricing disputes (or disapproved for other reasons). Functional formatting checks can also be made, such as, verifying the billing amount is in the appropriate decimal precision. A prepay interface can be used by the operator to invoke prepay services (e.g., authorization and debit of prepay balance), which is similar to conventional prepay services.

In addition to the operator interfaces (e.g., validation logic), additional billing integration for processing consumer/subscriber billing and developer payment can be added, for value billing events. Although an operator can leverage much of an existing billing system, the AVB system has many billing integration aspects. For example, the AVB billing events can be treated as a distinct billing event type from application download billing events. In addition, adjustments performed against AVB billing events can result in transaction adjustment events referencing the adjusted AVB transaction ID (unique code representing the AVB transaction, as discussed above). For example, a short description of the purchased service can be passed from the AVB application, since the service is typically not in the operator's catalog. Also, the billing amount passed from the value billing application can be included as the price billed to the subscriber.

The adjustment services can support online or off-line adjustment processing, which can include AVB billing events. However, typically a requested service is not associated with a part number in an operator's catalog. Accordingly, a customer service representative can view the AVB application that logged the value billing event by part name and part number, but the value service itself is defined by the application and specified in the billing description. Accordingly, a long description can optionally be included in the AVB billing request that can provide greater detail than the short description regarding the AVB transaction. The long description is typically only available for customer service access and is not typically included in the reports and subscriber billing. Adjustments on AVB billing events can be validated against the similar adjustment rules as other types of billing events (e.g., download and subscription billing events), including using similar adjustment periods.

Figure 6A:
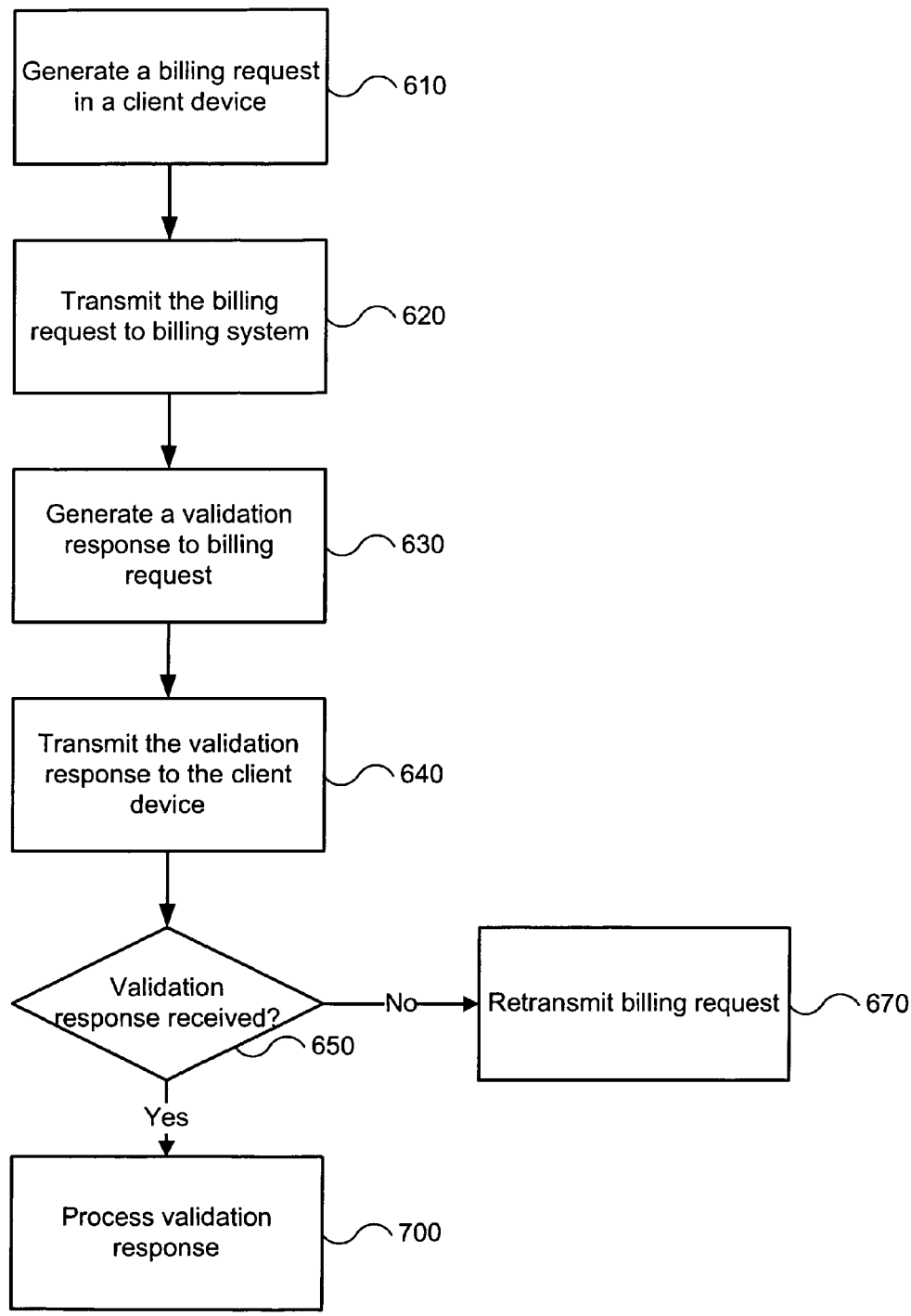
FIG. 6A is an illustration of an application-based value billing process in accordance with at least one embodiment of the invention.

In view of the foregoing disclosure, those skilled in the art will recognize that embodiments of the invention include methods of performing the sequence of actions, operations and/or functions discussed herein. For example, FIG. 6A illustrates a process in accordance with at least one embodiment of the invention. A billing request can be generated at a client device, block 610. The billing request can be transmitted to the billing server/system, block 620. A validation response in response to the billing request can be generated at the billing system, block 630. The validation response can be transmitted to the client device, block 640. The validation response may or may not be received at the client device, block 650. If the validation response is not received (e.g., after a predetermined time), the billing request can be retransmitted, until a validation response is received or predetermined number of retransmits are attempted, block 670. If the validation response is received the validation response can be processed at the client device, block 700, which is discussed in greater detail below.

Figure 6B:
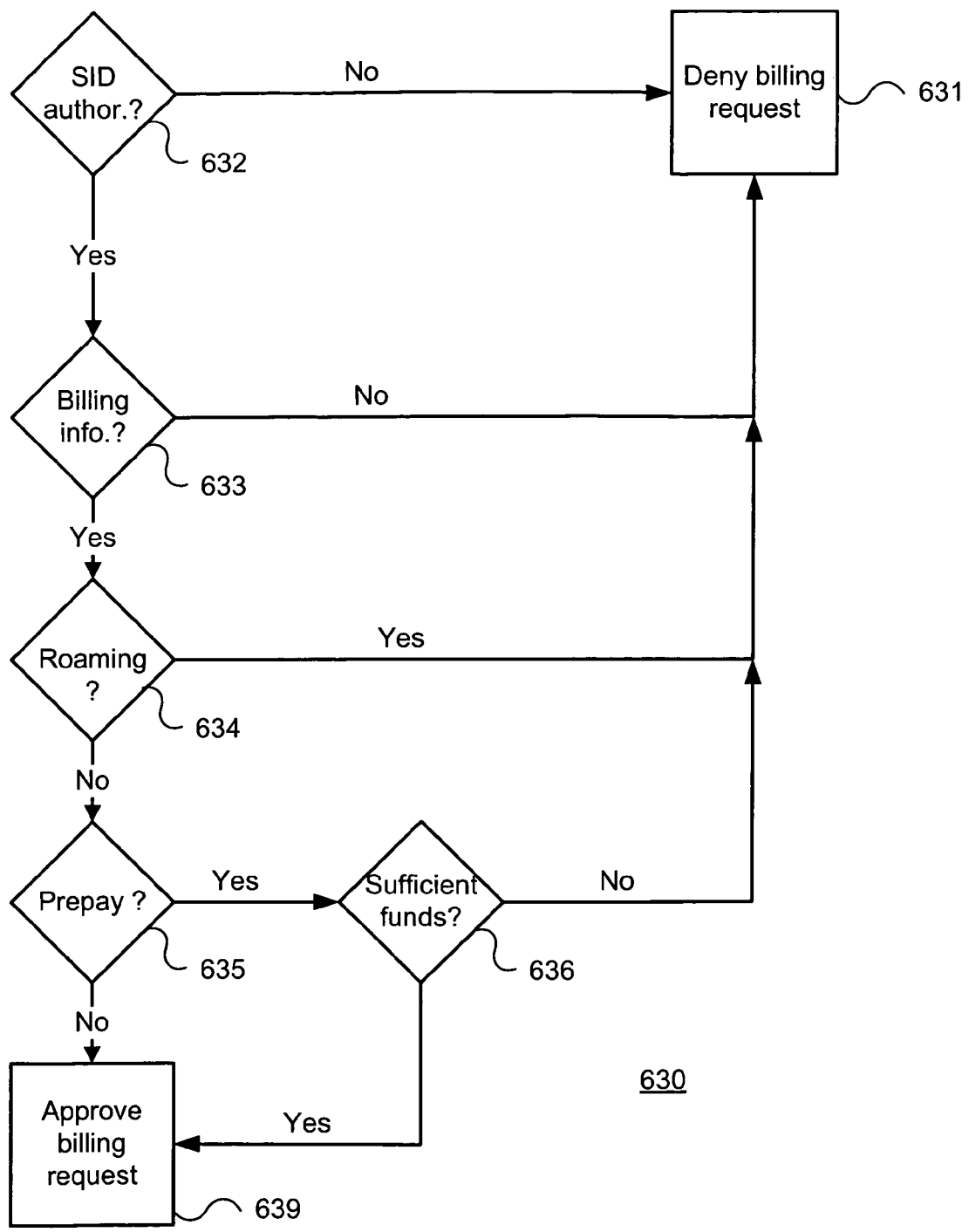
FIG. 6B is an illustration of validation logic in accordance with at least one embodiment of the invention.

Referring to FIG. 6B, the validation process of block 630 is further illustrated. For example, as part of the validation process the SID can be checked to determine if the SID is authorized for value billing services, block 632. If the SID is not authorized, then the billing request can be denied, block 631. The billing request can be checked for valid billing information (e.g., appropriate currency, formatting, and the like), block 633. If invalid billing information is detected, then the billing request can be denied, block 631. The roaming status of the client device can be checked, block 634. If the client device is roaming, then the billing request can be denied, block 631. The prepay status of the SID can be checked, block 635. If the SID is associated with a prepay plan, then the balance can be checked for sufficient funds to cover the billing request, block 636. If the funds are insufficient, then the billing request can be denied, block 631. If the funds are sufficient and the billing request has not been denied for other reasons, as discussed above, the billing request can be approved, block 639. The foregoing discussion and related illustration is merely examples of aspects of the invention and the invention is not limited to these examples. The validation process can be configured with many alternatives validation checks added or removed from the foregoing illustration, as desired by the operator.

Figure 7A:
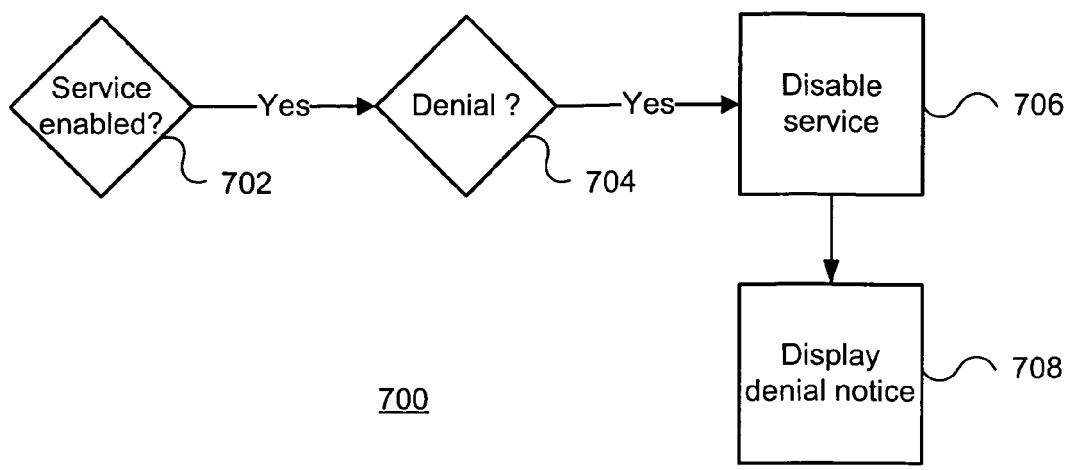
FIGS. 7A and 7B are illustrations of processing a validation response at a client device in accordance with at least one embodiment of the invention.
Figure 7B:
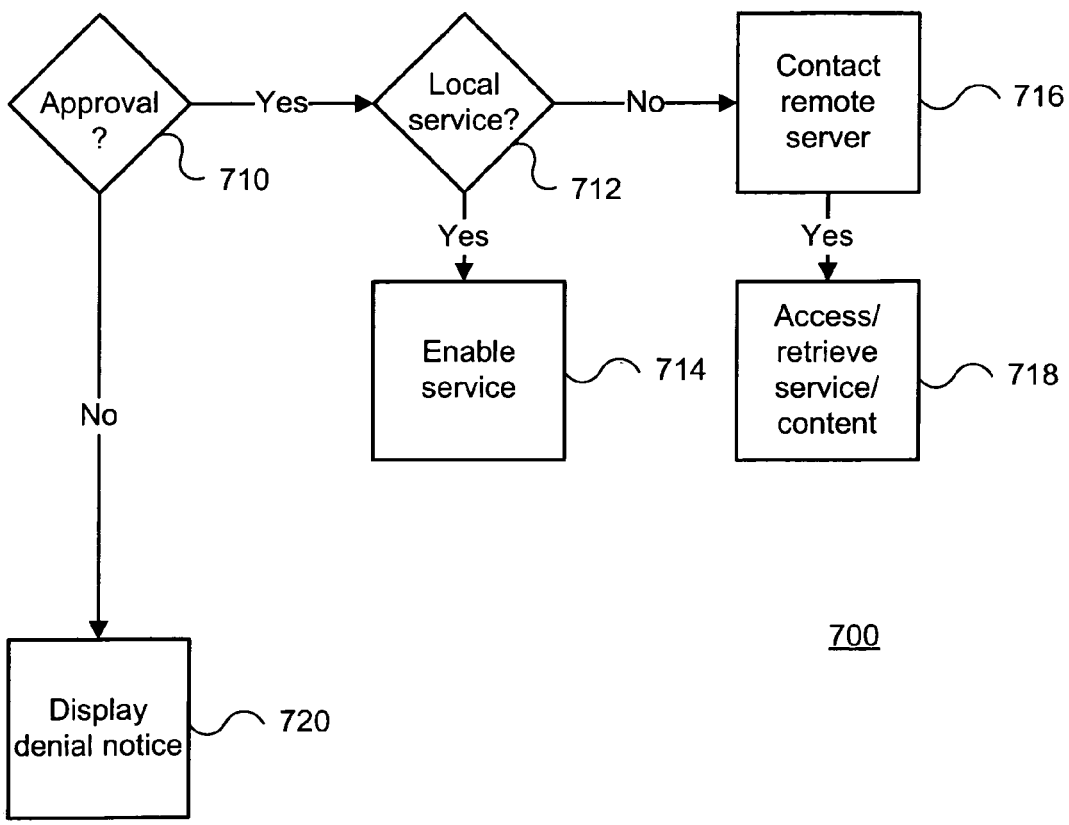

Likewise, a non-limiting example of processing the validation response 700 is illustrated in FIGS. 7A and 7B. For example, an application may optionally enable all or certain services before the validation response is received. These services may be determined based on various criteria established by the developer, such as, cost of the service, to avoid delay the service (e.g., an added feature in an arcade game) and the like. Accordingly, as illustrated in FIG. 7A, a check to see if the service related to the validation response is enabled can be performed, block 702. If the service is enabled, the validation response can be checked for a denial, block 704. If a denial is received, the service can be disabled, block 706. Optionally, a notification that the billing request was denied and/or service disabled can be displayed on the client device, block 708.

An application may not enable some or any services prior to receiving the validation response. Accordingly, as illustrated in FIG. 7B, the validation response can be checked for an approval, block 710. If the validation response indicates an approval and the service is available locally (e.g., in the application itself), block 712, the service can be enabled directly by the application, block 714. However, if the service is not available on the client device, a remote server/content server can be contacted, block 716 and the service/content can be accessed and/or retrieved (e.g., tickets purchased, music downloaded, video streamed, and the like), block 718. If the validation response is not approved, a notification that the billing request and/or requested service is denied can be displayed, block 720. Those skilled in the art will appreciate that only one of the processes illustrated in FIGS. 7A and 7B, may be used by an application or both may be used by an application (e.g., when some services are enabled before approval via the validation response, and other service offered by the application are not.)

Once again, the foregoing discussion and related illustration are merely examples of aspects of the invention and the invention is not limited to these examples. Further, other methods and alternatives can be recognized by those skilled in the art, and the illustrated examples are not intended as limiting of the methods disclosed herein.

In further embodiments, those skilled in the art will appreciate that the foregoing methods illustrated and those disclosed herein can be implemented by the execution of a program embodied on a computer readable medium, such as the memory of a computer platform. The instructions can reside in various types of signal-bearing or data storage primary, secondary, or tertiary media. The media may comprise, for example, RAM accessible by, or residing within, the client device and/or server. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, or EEPROM), flash memory cards, an optical storage device (e.g. CD-ROM, WORM, DVD, digital optical tape), paper "punch" cards, or other suitable data storage media including digital and analog transmission media.

The application-based value billing (AVB) system described in the foregoing description can be used to open new revenue opportunities for both operators and developers. Additionally, it can allow consumers/subscribers to have increased control and choice in what they buy and do. Content support allows consumers to customize their experience while using applications on client devices. Accordingly, consumers can utilize these value-added offerings to be more productive with their time, whether navigating through traffic or managing contacts, and to enhance their enjoyment of games, songs, and other entertainment.

While the foregoing disclosure shows illustrative embodiments of the invention, it should be noted that various changes and modifications can be made herein without departing from the scope of the invention. For example, the functions, steps, and/or actions of the method claims in accordance with the embodiments of the invention described herein need not be performed in any particular order. Furthermore, although elements of the invention may be described or claimed in the singular, the plural is contemplated unless limitation to the singular is explicitly stated. Likewise, functional elements that are indicated as part of a server and/or system can be organized in any operable fashion and can be integrated or separated as desired. For example, the billing server can reside on a separate server from the validation logic, or both can reside on a common server and/or be integrated into a common element.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for application-based billing, the method comprising:
    generating an application-based billing request for purchase approval within a client device making the purchase, the client device being a wireless subscriber unit configured to communicate with a wireless subscriber billing system;
    transmitting the billing request including a subscriber identification (SID) to the billing system;
    generating a validation response to the billing request at the billing system; and
    transmitting the validation response to the client device, wherein the billing request is an in-app billing request that requests activation of one or more additional features for an existing application configured for execution on the client device, and/or wherein the validation response is based on a roaming status of the client device.

2. The method of claim 1, wherein the client device is at least one of a wireless computing device, a cellular telephone, a personal digital assistant (PDA), or a paging device.

3. The method of claim 1, wherein the validation response is at least one of an approval of the billing request and a denial of the billing request.

4. The method of claim 1, further comprising:
    receiving the validation response at the client device; and processing the validation response.

5. The method of claim 4, wherein processing the validation response further comprises:
    enabling a service linked to the billing request, if the validation response is an approval of the billing request.

6. The method of claim 4, wherein processing the validation response further comprises:
    connecting to a remote content server; and
    retrieving content linked to the billing request, if the validation response is an approval of the billing request.

7. The method of claim 4, wherein processing the validation response further comprises:
    indicating a denial of the billing request, if the validation response is a denial of the billing request.

8. The method of claim 1, further comprising:
    presenting an option to purchase a service including a list price on the client device; and
    receiving an acceptance of the purchase option, prior to generating the billing request.

9. The method of claim 1, further comprising:
    associating vendor data with the billing request.

10. The method of claim 9, further comprising:
    propagating the vendor data through the billing system; and
    generating a report including the vendor data.

11. The method of claim 1, wherein the billing request includes additional billing information and wherein the additional billing information is at least one of a list price, application ID, transaction ID, submit time, create time, currency, short description, long description, payee ID, vendor data, and SID hash.

12. The method of claim 1, wherein generating a validation response comprises:
    determining if the SID is associated with a prepay account;
    verifying sufficient funds are available in the prepay account; and
    denying the billing request, if insufficient funds are available.

13. The method of claim 1, wherein generating a validation response comprises:
    determining the roaming status of the client device; and
    denying the billing request, if the roaming status of the client device is roaming.

14. The method of claim 1, wherein generating a validation response comprises:
    determining if the SID is authorized for value billing services; and
    denying the billing request, if the SID is not authorized for value billing services.

15. The method of claim 1, wherein generating a validation response comprises:
    determining if the billing request contains valid billing information; and
    denying the billing request, if the billing information is not valid.

16. The method of claim 1, further comprising:
    enabling a service related to the billing request prior to receipt of the validation response;
    and disabling the service, if the validation response is a denial of the billing request.

17. The method of claim 1, wherein an application associated with the billing request is configured to be executed at the client device.

18. A wireless subscriber billing system, comprising:
    a wireless client device, including an application operable to generate and transmit an application-based billing request for making a purchase and receive a validation response;
    a wireless subscriber billing server configured to receive the billing request and transmit the validation response; and
    validation logic configured to generate the validation response in response to the billing request,
    wherein the billing request is an in-app billing request that requests activation of one or more additional features for an existing application configured for execution on the client device, and/or wherein the validation response is based on a roaming status of the client device.

19. The billing system of claim 18, wherein the client device is at least one of a wireless computing device, a cellular telephone, a personal digital assistant (PDA), or a paging device.

20. The billing system of claim 18, further comprising:
a transaction manager configured to receive transaction data related to the billing request and to generate a billing event;
a client billing module configured to receive the billing event from the transaction manager and generate a bill; and
a settlement module configured to at least one of receive the billing event from the transaction manager, invoice a carrier, and pay a service provider.

21. The billing system of claim 18, wherein the billing server is configured to associate additional billing information with the billing request.

22. The billing system of claim 18, wherein the validation response is at least one of an approval of the billing request or a denial of the billing request.

23. The billing system of claim 18, wherein the application is further configured to enable a service linked to the billing request, if the validation response is an approval of the billing request.

24. The billing system of claim 18, wherein the application is further configured to connect to a remote content server; and to retrieve content linked to the billing request, if the validation response is an approval of the billing request.

25. A wireless client device comprising:
a transceiver capable of wirelessly transmitting and receiving data;
a user interface; and
an application operable to generate an application-based billing request upon purchase of one or more value-added services by the client device, transmit the billing request to a wireless subscriber billing system using the transceiver, and approve or deny the one or more value-added services on receiving a validation response associated with the billing request from the billing system, wherein the billing request is an in-app billing request that requests activation of one or more additional features for an existing application configured for execution on the client device, and/or wherein the validation response is based on a roaming status of the client device.

26. The client device of claim 25, wherein the application is further configured to retransmit the billing request, if the validation response is not received.

27. The client device of claim 25, wherein the application is operable to present a denial of request indication on the user interface, if the validation response indicates a denial of the one or more value-added services and to process the validation response, if the validation response indicates an approval of the one or more value-added services.

28. The client device of claim 25, wherein the application is further operable to activate at least one of the one or more value-added services linked to the billing request, if the validation response indicates an approval of the at least one value-added service.

29. The client device of claim 25, wherein the application is further configured to connect to a remote content server, and to retrieve content linked to the billing request if the validation response indicates an approval of the one or more value-added services.

30. The client device of claim 25, wherein the application is further configured to present an option to purchase a service including a list price on the user interface, and to receive an acceptance of the purchase option from the user interface, prior to generating the billing request.

31. The client device of claim 25, wherein the client device is at least one of a wireless computing device, a cellular telephone, a personal digital assistant (PDA), or a paging device.

32. A wireless subscriber billing system comprising:
a transceiver capable of wirelessly transmitting and receiving data;
a wireless subscriber billing server operably coupled to the transceiver, wherein the billing server operates to receive an application-based billing request for purchase approval including a subscriber identification (SID) from a client device making the purchase and to transmit a validation response to the client device; and
validation logic configured to generate the validation response in response to the billing request,
wherein the billing request is an in-app billing request that requests activation of one or more additional features for an existing application configured for execution on the client device, and/or wherein the validation response is based on a roaming status of the client device.

33. The billing system of claim 21, further comprising:
a transaction manager configured to receive transaction data related to the billing request and to generate a billing event;
a billing module configured to receive the billing event from the transaction manager and to generate a subscriber bill; and
a settlement module configured to at least one of receive the billing event from the transaction manager, invoice an operator, and pay a service provider.

34. The billing system of claim 21, wherein the billing server is configured to associate additional billing information with the billing request.

35. The billing system of claim 21, wherein the validation logic comprises:
logic configured to determine if the SID is associated with a prepay account;
logic configured to verify sufficient funds are available in the prepay account; and
logic configured to deny the billing request, if insufficient funds are available.

36. The billing system of claim 21, wherein the validation logic comprises:
logic configured to determine the roaming status of the client device; and
logic configured to deny the billing request, if the roaming status of the client device is roaming.

37. The billing system of claim 21, wherein the validation logic comprises:
logic configured to determine if the SID is authorized for value billing services; and
logic configured to deny the billing request, if the SID is not authorized for value billing services.

38. The billing system of claim 21, wherein the validation logic comprises:
logic configured to determine if billing information in the billing request is valid; and logic configured to deny the billing request, if the billing information is valid.

39. A non-transitory computer-readable medium on which is stored a computer program, the computer program comprising instructions which, when executed by a wireless client device, causes the client device to perform operations, the instructions comprising:
at least one instruction for generating an application-based billing request at the client device for approval of a purchase made by the client device, the client device being a wireless subscriber unit configured to communicate with a wireless subscriber billing system;
at least one instruction for transmitting the billing request to a billing system; and
at least one instruction for receiving a validation response associated with the billing request from the billing system,
wherein the billing request is an in-app billing request that requests activation of one or more additional features for an existing application configured for execution on the client device, and/or wherein the validation response is based on a roaming status of the client device.

40. The non-transitory computer-readable medium of claim 39, the instructions further comprising:
at least one instruction for retransmitting the billing request, if the validation response is not received.

41. The non-transitory computer-readable medium of claim 39, the instructions further comprising:
at least one instruction for activating a service linked to the billing request, if the validation response indicates an approval of the billing request.

42. The non-transitory computer-readable medium of claim 39, the instructions further comprising:
at least one instruction for connecting to a remote content server; and
at least one instruction for retrieving content linked to the billing request, if the validation response indicates an approval of the billing request.

43. A wireless subscriber billing system, comprising:
means for generating an application-based billing request within a client device making a purchase, the client device being a wireless subscriber unit configured to communicate with the wireless subscriber billing system;
means for transmitting the billing request including a subscriber identification (SID) to a billing server;
means for generating a validation response to the billing request at the billing server; and
means for transmitting the validation response to the client device,
wherein the billing request is an in-app billing request that requests activation of one or more additional features for an existing application configured for execution on the client device, and/or wherein the validation response is based on a roaming status of the client device.

44. The billing system of claim 43, wherein the client device is at least one of a wireless computing device, a cellular telephone, a personal digital assistant (PDA), or a paging device.

45. The billing system of claim 43, further comprising:
means for receiving the validation response at the client device; and
means for processing the validation response.

46. The billing system of claim 45, wherein the means for processing the validation response comprises:
means for enabling a service linked to the billing request, if the validation response is an approval of the billing request.

47. The billing system of claim 45, wherein the means for processing the validation response comprises:
means for connecting to a remote content server; and
means for retrieving content linked to the billing request, if the validation response is an approval of the billing request.

48. The billing system of claim 45, wherein the means for processing the validation response comprises:
means for indicating a denial of the billing request, if the validation response is configured to deny the billing request.

49. The billing system of claim 45, further comprising:
means for presenting an option to purchase a service including a list price on the client device; and
means for receiving an acceptance of the purchase option, prior to generating the billing request.

50. The billing system of claim 45, further comprising:
means for determining if the billing request contains valid billing information; and
means for denying the billing request, if the billing information is not valid.

51. The billing system of claim 45, further comprising:
means for generating a subscriber bill based on the billing request.

52. The billing system of claim 45, further comprising:
means for generating a report based on the billing request; and
means for communicating the report to at least one of an operator or a developer.

53. A method for wirelessly communicating application-based billing requests, comprising:
generating an application-based billing request at a wireless client device for approval of a purchase made by the client device, the client device being a wireless subscriber unit configured to communicate with a wireless subscriber billing system;
transmitting the billing request from the client device to the billing system; and
receiving a validation response associated with the billing request at the client device from the billing system,
wherein the billing request is an in-app billing request that requests activation of one or more additional features for an existing application configured for execution on the client device, and/or wherein the validation response is based on a roaming status of the client device.

54. The method of claim 53, the billing request is generated by an application downloaded to the client device which purchases at least one of one or more additional services offered by the application subsequent to the application download.

55. The method of claim 54, wherein the one or more additional services to be offered are determined based on one or more of carrier, platform, language, prepay information or environment.

56. An apparatus, comprising:
means for generating an application-based billing request within the apparatus for approval of a purchase made by the apparatus;
means for transmitting the billing request to a wireless subscriber billing system; and
means for receiving a validation response associated with the billing request from the billing system, wherein the billing request is an in-app billing request that requests activation of one or more additional features for an existing application configured for execution on the apparatus, and/or wherein the validation response is based on a roaming status of the apparatus.

57. A method for application-based billing, the method comprising:
   receiving an application-based billing request generated within a wireless client device for approval of a purchase made by the client device, the client device being a wireless subscriber unit configured to communicate with a wireless subscriber billing system;
   generating a validation response to the billing request received from the client device; and
   transmitting the validation response to the client device,
   wherein the billing request is an in-app billing request that requests activation of one or more additional features for an existing application configured for execution on the client device, and/or wherein the validation response is based on a roaming status of the client device.

58. An apparatus for application-based billing, the method comprising:
   means for receiving an application-based billing request generated within a wireless client device for approval of a purchase made by the client device, the client device being a wireless subscriber unit configured to communicate with a wireless subscriber billing system;
   means for generating a validation response to the billing request received from the client device; and
   means for transmitting the validation response to the client device,
   wherein the billing request is an in-app billing request that requests activation of one or more additional features for an existing application configured for execution on the client device, and/or wherein the validation response is based on a roaming status of the client device.

59. A non-transitory computer-readable medium on which is stored a computer program, the computer program comprising instructions which, when executed by at least one computing device associated with a wireless subscriber billing system, causes the at least one computing device to perform operations, the instructions, comprising:
   at least one instruction for receiving an application-based billing request generated within a wireless client device for approval of purchase made by the client device, the client device being a wireless subscriber unit configured to communicate with the wireless subscriber billing system;
   at least one instruction for generating a validation response to the billing request received from the client device; and
   at least one instruction for transmitting the validation response to the client device,
   wherein the billing request is an in-app billing request that requests activation of one or more additional features for an existing application configured for execution on the client device, and/or wherein the validation response is based on a roaming status of the client device.

60. An apparatus for application-based billing, comprising:
   a processor coupled to memory and configured to:
      receive an application-based billing request generated within a wireless client device for approval of a purchase made by the client device, the client device being a wireless subscriber unit configured to communicate with a wireless subscriber billing system;
      generate a validation response to the billing request received from the client device; and
      transmit the validation response to the client device, wherein the billing request is an in-app billing request that requests activation of one or more additional features for an existing application configured for execution on the client device, and/or wherein the validation response is based on a roaming status of the client device.

* * * * *